(12) United States Patent
Zhang et al.

(10) Patent No.: US 10,439,398 B2
(45) Date of Patent: Oct. 8, 2019

(54) REACTIVE POWER OPTIMIZATION SYSTEM AND METHOD OF POWER GRID BASED ON THE DOUBLE-FISH-SWARM ALGORITHM

(71) Applicant: Northeastern University, Shenyang, Liaoning Province (CN)

(72) Inventors: Huaguang Zhang, Shenyang (CN); Jun Yang, Shenyang (CN); Qiuye Sun, Shenyang (CN); Feiye Wu, Shenyang (CN); Xinrui Liu, Shenyang (CN); Dongsheng Yang, Shenyang (CN); Zhiliang Wang, Shenyang (CN); Jian Feng, Shenyang (CN); Bonan Huang, Shenyang (CN); Yanhong Luo, Shenyang (CN); Guotao Hui, Shenyang (CN); Zhenwei Liu, Shenyang (CN)

(73) Assignee: NORTHEASTERN UNIVERSITY, Shenyang, Liaoning Province (CN)

( * ) Notice: Subject to any disclaimer, the term of this patent is extended or adjusted under 35 U.S.C. 154(b) by 53 days.

(21) Appl. No.: 15/577,127

(22) PCT Filed: Jun. 16, 2017

(86) PCT No.: PCT/CN2017/088698
§ 371 (c)(1),
(2) Date: Nov. 27, 2017

(87) PCT Pub. No.: WO2018/103294
PCT Pub. Date: Jun. 14, 2018

(65) Prior Publication Data
US 2018/0309294 A1     Oct. 25, 2018

(51) Int. Cl.
*H02J 3/18*     (2006.01)
*G05F 1/14*     (2006.01)
(Continued)

(52) U.S. Cl.
CPC ............. *H02J 3/1885* (2013.01); *G05F 1/14* (2013.01); *H02J 3/16* (2013.01); *H02J 3/18* (2013.01);
(Continued)

(58) Field of Classification Search
CPC .......... H02J 3/1885; H02J 3/18; H02J 3/1878; H02J 3/16; H02J 2003/007; G05F 1/14
(Continued)

(56) References Cited

U.S. PATENT DOCUMENTS

| | | | | |
|---|---|---|---|---|
| 2010/0217452 A1* | 8/2010 | McCord | ................. | G06Q 50/06 700/295 |
| 2010/0217549 A1* | 8/2010 | Galvin | ..................... | H04B 3/54 702/62 |
| 2016/0301210 A1* | 10/2016 | Bamberger | ............ | G06Q 50/06 |

FOREIGN PATENT DOCUMENTS

| | | |
|---|---|---|
| CN | 102684207 A | 9/2012 |
| CN | 103580023 A | 2/2014 |
| CN | 106549394 A | 3/2017 |

* cited by examiner

*Primary Examiner* — Ziaul Karim
(74) *Attorney, Agent, or Firm* — Muncy, Geissler, Olds & Lowe, P.C.

(57) ABSTRACT

The invention provides a reactive power optimization system and a method of a power grid based on a double-fish-swarm algorithm. The system includes a power grid state data acquiring module, a reactive power regulating module and a reactive power executing module. The power grid state data acquiring module includes a power grid state data acquiring processor and a relay transmitter. The reactive power regulating module is a control terminal. The reactive power executing module includes generator terminal voltage regulators, transformer tap regulators and reactive power compensation regulators. The method is used for acquiring the initial data to be optimized in the current network; and optimizing the initial data to be optimized in the current network based on a double-fish-swarm algorithm so as to obtain optimal value of control variables in the power grid. According to the method, the distribution network to be optimized can realize reasonable reactive power flow distribution.

16 Claims, 7 Drawing Sheets

(51) Int. Cl.
*H02J 3/16* (2006.01)
*H02J 3/00* (2006.01)
(52) U.S. Cl.
CPC ....... *H02J 3/1878* (2013.01); *H02J 2003/007* (2013.01)
(58) Field of Classification Search
USPC .......................................................... 700/89
See application file for complete search history.

REACTIVE POWER OPTIMIZATION SYSTEM AND METHOD OF POWER GRID BASED ON THE DOUBLE-FISH-SWARM ALGORITHM

BACKGROUND OF THE INVENTION

1. Field of the Invention

The present invention belongs to the technical field of reactive power optimization of a power system, and particularly relates to a reactive power optimization system and method of a power grid based on a double-fish-swarm algorithm.

2. The Prior Arts

Reactive power optimization of the power system refers to: under the condition that the system active load, active power supply and power flow distribution are given, the values of some control variables in the system are determined through optimization calculation, so as to find an operation mode in which one or more performance indicators, such as the minimum active network loss, the optimal voltage quality and the least annual expenses, of the system reach the optimal state under the premise of meeting all constraint conditions. The rationality of system reactive power distribution is directly related to the safety and stability of the power system, and is closely associated with economic benefits. On one hand, if the reactive power of the system is insufficient, a low voltage level can occur, some factories and household appliances cannot operate normally, and once the system is disturbed, the voltage can be lower than a critical voltage, resulting in voltage collapse, and further leading to catastrophic accidents because of system collapse due to loss of synchronization. On the other hand, if the reactive power of the system is excessive, the voltage is too high, which endangers the safety of the system and equipment. In addition, the unreasonable flow of the reactive power of the system can increase the pressure drop of lines, increase line loss, and decrease the economy of power supply. In summary, through the reasonable allocation and optimized operation of reactive power equipment, the network loss can be reduced effectively, the voltage quality can be improved, the stability of system voltage can be guaranteed, and the safety and economy of power system operation are improved.

At present, the methods for reactive power optimization mainly include conventional mathematical methods and intelligent optimization algorithms. The conventional mathematical methods are high in calculation speed, but have a high requirement for the continuity, non-convexity and differentiability of the optimization function, and have the defects of being easy to fall into a local optimal solution, and the like. The intelligent optimization algorithms have a strong optimization capability in dealing with optimization problems being nonlinear, multivariable, discontinuous, non-convex and the like.

As a new global optimization strategy, the artificial fish-swarm algorithm is applied to on-line identification of a time-varying system, robust PID parameter setting and optimization of a forward neural network, and good effects are achieved. The artificial fish-swarm algorithm has a good capability to obtain a global extreme value, and has the advantages of being insensitive to initial values and parameter selection, strong in robustness, simple (only a target function value is used), easy to realize, and the like. However, the artificial fish-swarm algorithm still has some defects, mainly including: the solving efficiency is not high, the solving time is long, the convergence rate in a later period is slow, the condition of falling into the local optimal solution easily occurs, and the accurate optimal solution is difficult to obtain.

SUMMARY OF THE INVENTION

In order to overcome the defects existing in the prior art, the present invention provides a reactive power optimization system and method of a power grid based on a double-fish-swarm algorithm.

The present invention adopts the technical scheme as follows:

A reactive power optimization system of a power grid based on a double-fish-swarm algorithm, including a power grid state data acquiring module, a reactive power regulating module and a reactive power executing module, the power grid state data acquiring module connected to the reactive power regulating module, the reactive power regulating module connected to the reactive power executing module, wherein the power grid state data acquiring module includes a power grid state data acquiring processor and a relay transmitter;

the reactive power regulating module is a control terminal;

the reactive power executing module includes generator terminal voltage regulators, transformer tap regulators and reactive power compensation regulators;

the input end of the power grid state data acquiring processor is connected with a power grid; the output end of the power grid state data acquiring processor is connected with the input end of the relay transmitter; the output end of the relay transmitter is connected with the input end of the control terminal; the output end of the control terminal is connected with the input end of each of the generator terminal voltage regulators, the input end of each of the transformer tap regulators and the input end of each of the reactive power compensation regulators; the output end of each of the generator terminal voltage regulators is connected with a corresponding generator in the power grid; the output end of each of the transformer tap regulators is connected with a corresponding transformer in the power grid; and the output end of each of the reactive power compensation regulators is connected with a corresponding reactive power compensation device in the power grid;

the power grid state data acquiring processor is used for acquiring the current network information of the power grid and judging whether the current network information meets the optimal state required by the power grid or not; and if the current network information cannot meet the optimal state required by the power grid, the current network information is transmitted to the relay transmitter, wherein the current network information includes power grid node information, branch information, generator information, transformer information and reactive power compensation device information;

the relay transmitter is used for transmitting the power grid node information, the branch information, the generator information, the transformer information and the reactive power compensation device information which are acquired by the power grid state data acquiring processor and required for reactive power optimization in the network information to the control terminal; the reactive power regulating module includes a parameter acquiring unit, a double-fish-swarm algorithm-base reactive power optimization unit, and an optimization decision-making control unit, the parameter acquiring unit connected to the reactive power optimization unit, and the reactive power optimization unit connected to the optimization decision-making control unit;

the parameter acquiring unit is used for acquiring the power grid node information, the branch information, the generator information, the transformer information and the reactive power compensation device information transmitted by the relay transmitter and used as initial data to be optimized in the current network;

the double-fish-swarm algorithm-base reactive power optimization unit is used for establishing a mathematical model for reactive power optimization of a power system, and the acquired initial data to be optimized in the current network is optimized based on the double-fish-swarm algorithm, so that an optimal value of each of control variables in the power grid is obtained, wherein the control variables include generator terminal voltage amplitudes, transformer adjustable ratios, and the reactive power capacity of reactive power compensation devices;

the optimization decision-making control unit is used for transmitting the optimal values of the control variables to the reactive power executing module;

the generator terminal voltage regulators are used for regulating generator terminal voltages according to the optimal values of the generator terminal voltage amplitudes, obtained by the reactive power regulating module;

the transformer tap regulators are used for regulating transformer taps according to the optimal values of the transformer adjustable ratios, obtained by the reactive power regulating module; and the reactive power compensation regulators are used for regulating the compensation capacity of reactive power compensators according to the optimal values of the reactive power capacity of the reactive power compensation devices, obtained by the reactive power regulating module.

The mathematical model for establishing the reactive power optimization of the power system is shown as below:

$$\min F = \alpha_1 \sum_{h=1}^{nl} G_{lv}[u_l^2 + u_v^2 - 2u_l u_v \cos(\theta_v - \theta_l)] + \alpha_2 \sum_{v=1}^{N_d} \left(\frac{V_v - V_v^{sp}}{\Delta V_v^{max}}\right)^2 +$$

$$\lambda_u \sum_{v=1}^{N_d} \left|\frac{\Delta V_v}{V_{v,max} - V_{v,min}}\right|^2 + \lambda_q \sum_{k=1}^{N_g} \left|\frac{\Delta Q_k}{Q_{k,max} - Q_{k,min}}\right|^2,$$

wherein, F is an objective function of the mathematical model for reactive power optimization of a power grid, $$\Delta V_v = \begin{cases} V_v - V_{v,max} & V_v > V_{v,max} \\ 0 & V_{v,min} \leq V_v \leq V_{v,max} \\ V_{v,min} - V_v & V_v < V_{v,min} \end{cases}$$

$$\Delta Q_k = \begin{cases} Q_k - Q_{k,max} & Q_k > Q_{k,max} \\ 0 & Q_{k,min} \leq Q_k \leq Q_{k,max} \\ Q_{k,min} - Q_k & Q_{k,min} < Q_k \end{cases}$$

$1 \leq h \leq nl$, nl is the total number of branches in a power grid system, $G_{lv}$ is the electrical conductance of a connecting branch l–v, $\theta_v$ is the phase angle of a node v, $\theta_l$ is the phase angle of a node l, $\alpha_1$ is the weight coefficient of an objective function for minimum network loss, $\alpha_2$ is the weight coefficient of an objective function for optimum voltage, $u_l$ is the voltage of the node l, $u_v$ is the voltage of the node v, $1 \leq v \leq N_d$, $N_d$ is the total number of load nodes in the power grid system, $1 \leq k \leq N_g$, $N_g$ is the number of generators in the power grid, $V_v$ is the voltage of the node v, $V_{v,min}$ is the set voltage value of the node v, $\Delta V_v^{max}$ is the maximum deviation value of voltage of the node v, $V_{v,max}$ is the upper limit value of the voltage of the node v, $V_{v,min}$ is the lower limit value of the voltage of the node v, $\lambda_u$ is a penalty coefficient for voltage outside tolerances of the load nodes, $\lambda_q$ is a penalty coefficient for the reactive power output outside tolerances of the generators, $Q_k$ is the reactive power output of a generator node k, $Q_{k,max}$ is the upper limit value of the reactive power output of the generator node k, and $Q_{k,min}$ is the lower limit value of the reactive power output of the generator node k.

The special process for optimizing the obtained initial data to be optimized in the current network based on the double-fish-swarm algorithm so as to obtain the optimal values of control variables in the power grid includes the steps of:

generating a small fish-swarm and a ferocious fish-swarm in a random manner according to the upper limit value and the lower limit value of the control variables to be optimized in the power grid;

initializing the optimal value of current food concentration, and displaying the initialized optimal value of current food concentration in a bulletin board: by using the reciprocal 1/F of the objective function of the mathematical model for reactive power optimization of a power grid as a value FC of food concentration, calculating the value of food concentration in the current network and of small fishes and ferocious fishes under an initial data condition, taking the maximum value of food concentration as the optimal value of current food concentration, displaying the optimal value of current food concentration in the bulletin board, and saving the state and the current value FC;

enabling the small fish-swarm to act: enabling small fish individuals to perform a foraging clustering behavior, a rear-end behavior and a protective clustering behavior according to the distance between each of the small fish individuals and ferocious fish individuals as well as the distance between the small fish individuals in the small fish-swarm, and updating the value in the bulletin board Y1;

enabling the ferocious fish-swarm to act: enabling each of the ferocious fish individuals to perform a predation behavior, a tracking behavior and a clustering behavior according to the distance between each of the ferocious fishes and the small fish individuals as well as the distance between the ferocious fish individuals in the ferocious fish-swarm, and updating the value in the bulletin board Y2; and when the iteration times achieve the maximum iteration times, taking the greater values of food concentration displayed in the bulletin boards Y1 and Y2 as well as the state thereof as optimal results so as to obtain the optimal values of the control variables, namely the optimal values of the generator terminal voltage amplitudes, the transformer adjustable ratios, and the reactive power capacity of the reactive power compensation devices.

A method for reactive power optimization of a power grid by adopting the reactive power optimization system of a power grid based on the double-fish-swarm algorithm, includes the steps of:

step 1: acquiring the current network information of the power grid state data and judging whether the current network information meets the optimal state required by the power grid or not by the power grid state data acquiring processor; and if the current network information cannot meet the optimal state required by the power grid, transmitting the current network information to the relay transmitter;

step 2: transmitting the power grid node information, the branch information, the generator information, the transformer information and the reactive power compensation device information which are acquired by the power grid state data acquiring processor and required for reactive power optimization in the network information to the control terminal, by the relay transmitter;

step 3: acquiring the power grid node information, the branch information, the generator information, the transformer information and the reactive power compensation device information transmitted by the relay transmitter, by the control terminal as initial data to be optimized in the current network;

step 4: establishing the mathematical model for the reactive power optimization of the power system through the control terminal, optimizing the acquired initial data to be optimized in the current network based on the double-fish-swarm algorithm so as to obtain the optimal values of the control variables in the power grid, and transmitting the optimal values of the control variables to the reactive power executing module; and step 5: regulating generator terminal voltages by using the generator terminal voltage regulators according to the optimal values of the generator terminal voltage amplitudes, regulating the transformer taps by using the transformer tap regulators according to optimal values of the transformer adjustable ratios, and regulating the compensation capacity of the reactive power compensators by using the reactive power compensation regulators according to the optimal values of the reactive power capacity of the reactive power compensation devices.

The step 4 includes the steps of:

step 4.1: establishing a mathematical model for the reactive power optimization of the power system by using an alpha-method, with the minimum network loss and the optimal voltage level as the optimization objectives:

$$\min F = \alpha_1 \sum_{h=1}^{nl} G_{lv}[u_l^2 + u_v^2 - 2u_l u_v \cos(\theta_v - \theta_l)] + \alpha_2 \sum_{v=1}^{N_d} \left(\frac{V_v - V_v^{sp}}{\Delta V_v^{max}}\right)^2 + \lambda_u \sum_{v=1}^{N_d} \left|\frac{\Delta V_v}{V_{v,max} - V_{v,min}}\right|^2 + \lambda_q \sum_{k=1}^{N_g} \left|\frac{\Delta Q_k}{Q_{k,max} - Q_{k,min}}\right|^2;$$

step 4.2: setting parameters for the double-fish-swarm algorithm: the size N1 of the small fish-swarm, the size N2 of the ferocious fish-swarm, the perception range Visual1 of the small fish-swarm, the perception range Visual2 of the ferocious fish-swarm, the shift step length Step1 of the small fish-swarm, the shift step length Step2 of the ferocious fish-swarm, the crowding factor $\delta_1$ of the small fish-swarm, the crowding factor $\delta_2$ of the ferocious fish-swarm, and the maximum iteration times K>0;

step 4.3: generating a small fish-swarm in a random manner according to the upper limit value and the lower limit value of the control variables to be optimized in the power grid;

step 4.4: generating a ferocious fish-swarm in a random manner according to the upper limit value and the lower limit value of the control variables to be optimized in the power grid;

step 4.5: initializing the current iteration times k'=0, initializing the optimal value of current food concentration, and displaying the initialized optimal value of current food concentration in a bulletin board: by using 1/F as a value FC of food concentration, calculating the value of food concentration in the current network and of small fishes and ferocious fishes under an initial data condition, taking the maximum value of food concentration as the optimal value of current food concentration, displaying the optimal value of current food concentration in the bulletin board, and saving the state and the current value FC;

step 4.6: enabling the small fish-swarm to act: enabling small fish individuals to perform a foraging clustering behavior, a rear-end behavior and a protective clustering behavior according to the distance between each of the small fish individuals and ferocious fish individuals as well as the distance between the small fish individuals in the small fish-swarm, and updating the value in the bulletin board Y1;

step 4.7: enabling the ferocious fish-swarm to act: enabling each of the ferocious fish individuals to perform a predation behavior, a tracking behavior and a clustering behavior according to the distance between each of the ferocious fishes and the small fish individuals as well as the distance between the ferocious fish individuals in the ferocious fish-swarm, and updating the value in the bulletin board Y2;

step 4.8: judging whether the current iteration times k' reach the maximum iteration times K, if yes, executing the step 4.9; or else, k'=k'+1, and returning to the step 4.6;

step 4.9: taking the greater value of food concentration displayed in the bulletin boards Y1 and Y2 as well as the state thereof as optimal values so as to obtain the optimal values of the control variables, namely the optimal values of the generator terminal voltage amplitudes, the transformer adjustable ratios, and the reactive power capacity of the reactive power compensation devices; and step 4.10: transmitting the optimal values of the control variables to the reactive power executing module.

The step 4.3 includes the steps of:

step 4.3.1: initializing the number $t_1$=0 of the generated small fishes;

step 4.3.2: randomly generating the small fish individuals according to the value ranges of the control variables to be optimized in the power grid:

$$X=[U_{G11}, U_{G12}, \ldots U_{G1g}, K_{T11}, K_{T12}, \ldots, K_{T1t}, Q_{C11}, Q_{C12}, \ldots Q_{C1c}] = [x_1, x_2, \ldots, x_s, \ldots, x_S];$$

wherein, X is the value sequence of the control variables of the small fish individuals, $x_s = x_{s\ min} + \text{rand}(g) \times (x_{s\ max} - x_{s\ min})$, rand(g) is a random number of an interval (0, 1), $x_{s\ min}$ and $x_{s\ max}$ are respectively the lower limit value and the upper limit value of the corresponding control variables, $U_{G1g}$, $K_{T1t}$, and $Q_{C1c}$ are respectively the generator terminal voltage amplitude, the transformer adjustable ratio, and the reactive power capacity of the reactive power compensation devices in the randomly generated small and artificial fish individuals, $x_s$ is the control variables of the randomly generated small fish individuals, 1≤s≤S, S=$N_g$+$N_t$+$N_c$, $N_g$ is the number of the generators in the power grid, $N_t$ is the number of the transformers in the power grid, and $N_c$ is the number of the reactive power compensation devices in the power grid;

step 4.3.3: performing power flow calculation on the control variables in the randomly generated small fish individuals in the step 4.3.2 by using a P-Q decomposition method. If the power flow value of the current small fish individual is converged, retaining the small fish individual, generating a small fish number $t_1=t_1+1$ of the current small fish individual, and executing the step 4.3.4; or else, not retaining the small fish individual, and returning to the step 4.3.2; and step 4.3.4: if $t_1 \geq N1$, obtaining a current small fish-swarm, and executing the step 4.4; or else, returning to the step 4.3.2.

The step 4.4 includes the steps of:

step 4.4.1: initializing the number $t_2=0$ of the generated ferocious fishes;

step 4.4.2: randomly generating the ferocious fish individuals according to the value ranges of the control variables to be optimized in the power grid:

$$W=[U_{G21}, U_{G22}, \ldots U_{G2g}, K_{T21}, K_{T22}, \ldots, K_{T2t}, Q_{C21}, Q_{C22}, \ldots, Q_{C2c}]=[w_1, w_2, \ldots, w_s, \ldots, w_S];$$

wherein, W is the value sequence of the control variables of the ferocious fish individuals, $w_s = x_{s\ max} + \text{rand}(g) \times (x_{s\ max} - x_{s\ min})$, $U_{G2g}$, $K_{T2t}$ and $Q_{C2c}$ are respectively the generator terminal voltage amplitude, the transformer adjustable ratio, and the reactive power capacity of the reactive power compensation devices in the randomly generated ferocious fish individuals, and $w_s$ is the control variables of the randomly generated ferocious fish individuals;

step 4.4.3: performing power flow calculation on the control variables in the randomly generated ferocious fish individuals in the step 4.4.2 by using a P-Q decomposition method. If the power flow value of the current ferocious fish individual is converged, retaining the ferocious fish individual, generating a ferocious fish number $t_2=t_2+1$ of the current ferocious fish individual, and executing the step 4.4.4; or else, not retaining the ferocious fish individual, and returning to the step 4.4.2; and step 4.4.4: if $t_2 \geq N2$, obtaining a current ferocious fish-swarm, and executing the step 4.5; or else, returning to the step 4.4.2.

The step 4.6 includes the steps of:

step 4.6.1: determining the distance $D=\{D_{i1}, D_{i2}, \ldots, D_{ij}, \ldots, D_{iN2}\}$ between the current i th small fish individual $X_i$ and each of the ferocious fish individuals $W_j$, wherein, $D_{ij}=\|X_i-W_j\|$, $1 \leq j \leq N2$, and N2 is the number of the ferocious fish individuals;

step 4.6.2: if the distance $D_{ij} \leq \text{Visual1}$ between the current i th small fish individual $X_i$ and each of the ferocious fish individuals $W_j$, executing the step 4.6.3; or else, executing the step 4.6.5;

step 4.6.3: determining the total number n of the small fish individuals within the perception range of the i th small fish individual $X_i$, to determine a protective clustering safe position $X_{safe}$, and enabling the i th small fish individual $X_i$ to perform the protective clustering behavior so as to obtain an update value $X_{inext1}$ of the i th small fish individual performing the protective clustering behavior, wherein the calculation formula for the protective clustering safe position $X_{safe}$ is as follows:

$$X_{safe} = (X_{i1} + X_{i2} + \ldots + X_{in}) \times \lambda / n;$$

wherein, $\lambda = (n+p)/n$ is an escape factor, p is the total number of the ferocious fish individuals within the perception range Visual1 of the small fish individual $X_i$, and $X_{in}$ is the small fish individuals within the perception range of the small fish individual $X_i$;

the calculation formula for the update value $X_{inext1}$ of the i th small fish individual performing the protective clustering behavior is as follows:

$$X_{inext1} = X_i + \text{rand}(g) \times \text{Step1} \times \delta_1 \times (X_{safe} - X_i) / \|X_{safe} - X_i\|;$$

step 4.6.4: judging whether the update value $X_{inext1}$ of the current small fish individual performing the protective clustering behavior meets a constraint condition and the power flow is converged; if yes, recording the state of the update value $X_{inext1}$ calculating the value of food concentration, updating the value in the bulletin board Y1, and executing the step 4.7; or else, returning to the step 4.6.3;

step 4.6.5: determining the small fish individual $X_{j'}$ with the maximum value $FC_{j'}$ of food concentration in the small fish-swarm within the perception range of the i th small fish individual $X_i$, and enabling the i th small fish individual $x_i$ to perform the rear-end behavior so as to obtain an update value $X_{inext2}$ of the i th small fish individual $X_i$ performing the rear-end behavior, wherein the calculation formula for the update value $X_{inext2}$ of the i th small fish individual $X_i$ performing the rear-end behavior is as follows:

$$X_{inext2} = X_i + \text{rand}(g) \times \text{Step1} \times \delta_1 \times (X_{j'} - X_i) / \|X_{j'} - X_i\|;$$

step 4.6.6: determining the total number n of the small fish individuals within the perception range of the i th small fish individual $X_i$ to determine the central position $X_{c1}$ of the small fish individuals performing foraging clustering behavior, and enabling the i th small fish individual $X_i$ to perform the foraging clustering behavior so as to obtain an update value $X_{inext3}$ of the i th small fish individual performing the foraging clustering behavior, wherein the calculation formula for the central position $X_{c1}$ of the small fish individuals performing foraging clustering behavior is as follows:

$$X_{c1} = (X_{i1} + X_{i2} + \ldots + X_{in})/n;$$

the calculation formula for the update value $X_{inext3}$ of the i th small fish individual performing the foraging clustering behavior is as follows:

$$X_{inext3} = X_i + \text{rand}(g) \times \text{Step1} \times \delta_1 \times (X_{c1} - X_i) / \|X_{c1} - X_i\|;\text{ and}$$

step 4.6.7: judging whether the update value $X_{inext2}$ of the current small fish individual performing the rear-end behavior and the update value $X_{inext3}$ of the current small fish individual performing foraging clustering behavior meet constraint conditions and the power flow is converged; if yes, recording the state of the update value $X_{inext2}$ and the state of the update value $X_{inext3}$, calculating the value of food concentration, updating the value in the bulletin board Y1, and executing the step 4.7; or else, returning to the step 4.6.5.

The step 4.7 includes the steps of:

step 4.7.1: determining the distance $L = \{L_{i'1}, L_{i'2}, \ldots, L_{i'j''}, \ldots, L_{i'N1}\}$ between the current i'th ferocious fish individual $W_{i'}$ and each of the small fish individuals $X_{j''}$, wherein $L_{i'j''} = \|W_{i'} - X_{j''}\|$, $1 \leq j'' \leq N1$, and N1 is the number of the small fish individuals;

step 4.7.2: if the distance $L_{i'j''} \leq \text{Visual2}$ between the current i'th ferocious and artificial fish individual $W_{i'}$ and each of the small and artificial fish individuals $X_{j''}$, executing the step 4.7.3; or else, executing the step 4.7.6;

step 4.7.3: determining the total number m of the small fish individuals within the perception range of the current i'th ferocious fish individual $W_{i'}$, enabling the i'th ferocious fish individual $W_{i'}$ to perform the predation behavior with a central position $X_{c2}$ of small fish-swarm within the perception range of the i'th ferocious fish individual $W_{i'}$ as the maximum value of current food concentration, and updating the i'th ferocious fish individual $W_{i'}$ as the central position $x_{c2}$ of the small fish-swarm so as to obtain an update value $W_{i'next1}=X_{c2}$ of the i'th ferocious fish individual $W_{i'}$ performing the predation behavior, wherein the calculation formula for the central position $X_{c2}$ of small fish-swarms within the perception range of the i'th ferocious fish individual $W_{i'}$ is as follows:

$$X_{c2}=(X_{i'1}+X_{i'2}+\ldots+X_{i'm})/m;$$

wherein, $X_{i'm}$ is the small fishes within the perception range of the ferocious fish individual $W_{i'}$;

step 4.7.4: enabling the i'th ferocious fish individual $W_{i'}$ to perform the tracking behavior with the central position $X_{c2}$ of small fish-swarms within the perception range of the current i'th ferocious fish individual $W_{i'}$ as the maximum value of current food concentration so as to obtain an update value $W_{i'next2}$ of the i'th ferocious fish individual $W_{i'}$ performing the tracking behavior;

the calculation formula for the update value $W_{i'next2}$ of the i'th ferocious fish individual $W_{i'}$ performing the tracking behavior is as follows:

$$W_{i'next2}=W_{ij}+\text{rand}(g)\times\text{Step2}\times\delta_2\times(X_{c2}-W_{i'})/\|X_{c2}-W_{i'}\|;$$

step 4.7.5: judging whether the update value $W_{i'next1}$ of the current ferocious fish individual $W_{i'}$ performing the predation behavior and the update value $W_{i'next2}$ of the ferocious fish individual $W_{i'}$ preforming the tracking behavior meet the constraint conditions and the power flow is converged; if yes, updating the value in the bulletin board Y2, and executing the step 4.7.6; or else, returning to the step 4.7.3;

step 4.7.6: determining the total number r of the ferocious fish individuals within the perception range of the i'th ferocious fish individual $W_{i'}$ to determine the central position $W_c$ of the ferocious fish individuals preforming the clustering behavior, and enabling the i'th ferocious fish individual $W_{i'}$ to perform the clustering behavior so as to obtain an update value $W_{i'next3}$ of the i'th ferocious fish individual $W_{i'}$ performing the clustering behavior, wherein the calculation formula for the central position we of the fish individual performing the clustering behavior is as follows:

$$W_c=(W_{i'1}+W_{i'2}+\ldots+W_{i'r})/r;$$

wherein, $W_{i'r}$ is the ferocious fish individuals within the perception range of the i'th ferocious fish individual $W_{i'}$;

the calculation formula for the update value $W_{i'next3}$ of the i'th ferocious fish individual $W_{i'}$ performing the clustering behavior is as follows:

$$W_{i'next1}=W_i+\text{rand}(g)\times\text{Step2}\times\delta_2\times(W_c-W_{i'})/\|W_c-W_{i'}\|;$$
and step 4.7.7: judging whether the update value $W_{i'next3}$ of the current ferocious fish individual $W_{i'}$ performing the clustering behavior meets the constraint condition and the power flow is converged; if yes, recording the state of the update value $W_{i'next3}$, calculating the value of food concentration, updating the value in the bulletin board Y2, and executing the step 4.8; or else, returning to the step 4.7.6.

The reactive power optimization system and method disclosed by the present invention have the following beneficial effects. The present invention provides the reactive power optimization system and method of the power grid based on the double-fish-swarm algorithm. Modular processing is performed on the system, so that a reactive power optimization scheme is easy to control and implement. According to the reactive power optimization method based on double fish-swarms, a new fish-swarm and a ferocious fish-swarm, are introduced, so that the search range is enlarged, the defects, of being easy to fall into the local optimal solution and difficult to obtain the accurate optimal solution, of a basic fish-swarm algorithm are greatly overcome, convergence in the calculation process is improved, the optimization capability for reactive power optimization of a power grid can be effectively improved, and the reasonable distribution of reactive power flow for a distribution network to be optimized can be realized.

DETAILED DESCRIPTION OF THE PREFERRED EMBODIMENT

The specific embodiments disclosed by the present invention are described in details below with reference to the accompanying drawings.

Figure 1:
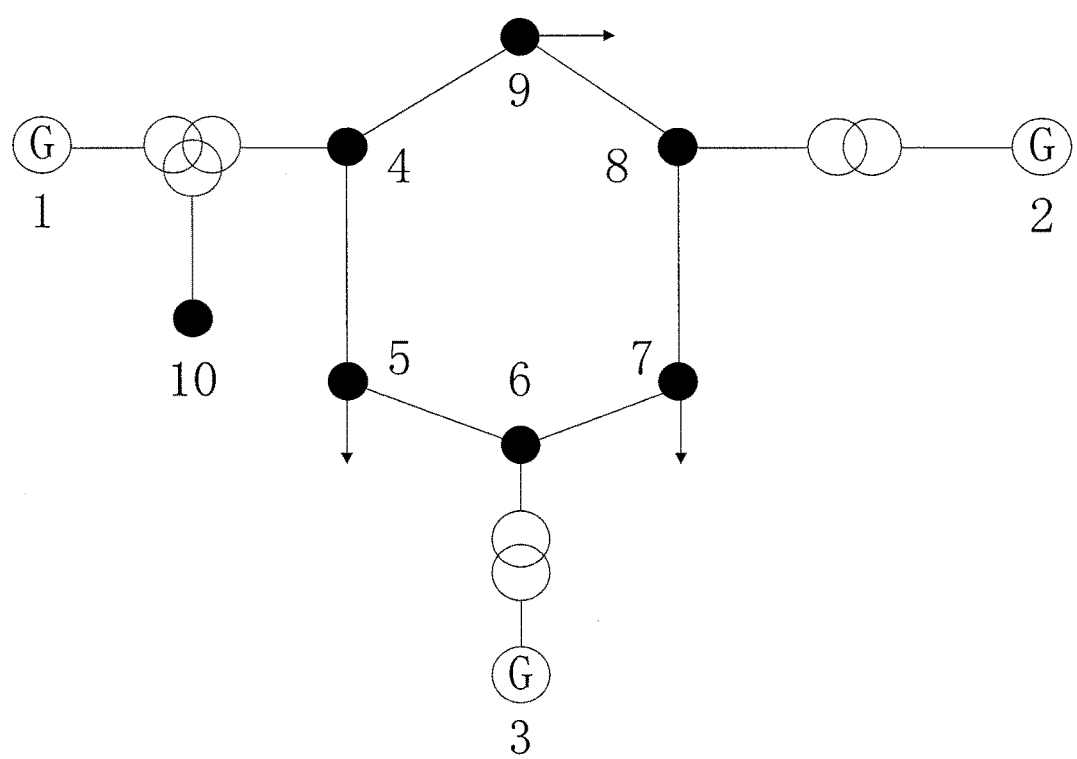
FIG. 1 is an IEEE10 node system in a preferred embodiment of the present invention.

In the embodiment, an IEEE10 node system as shown in FIG. 1 is adopted for simulation. The IEEE10 node system is a closed-loop system with six lines, three generator nodes, three load nodes and three on-load tap changing transformers. Among the three generator nodes, a node 1 is used as a balance node, the other two generator nodes are PV nodes, the other nodes in the system are PQ nodes, two reactive power compensation nodes are nodes 5 and 10, and the adjustable transformer branches are 1-4, 2-8, 3-6 and 4-10. The voltage level is 220 kV, and the total system load is 315+j255MVA.

Figure 2:
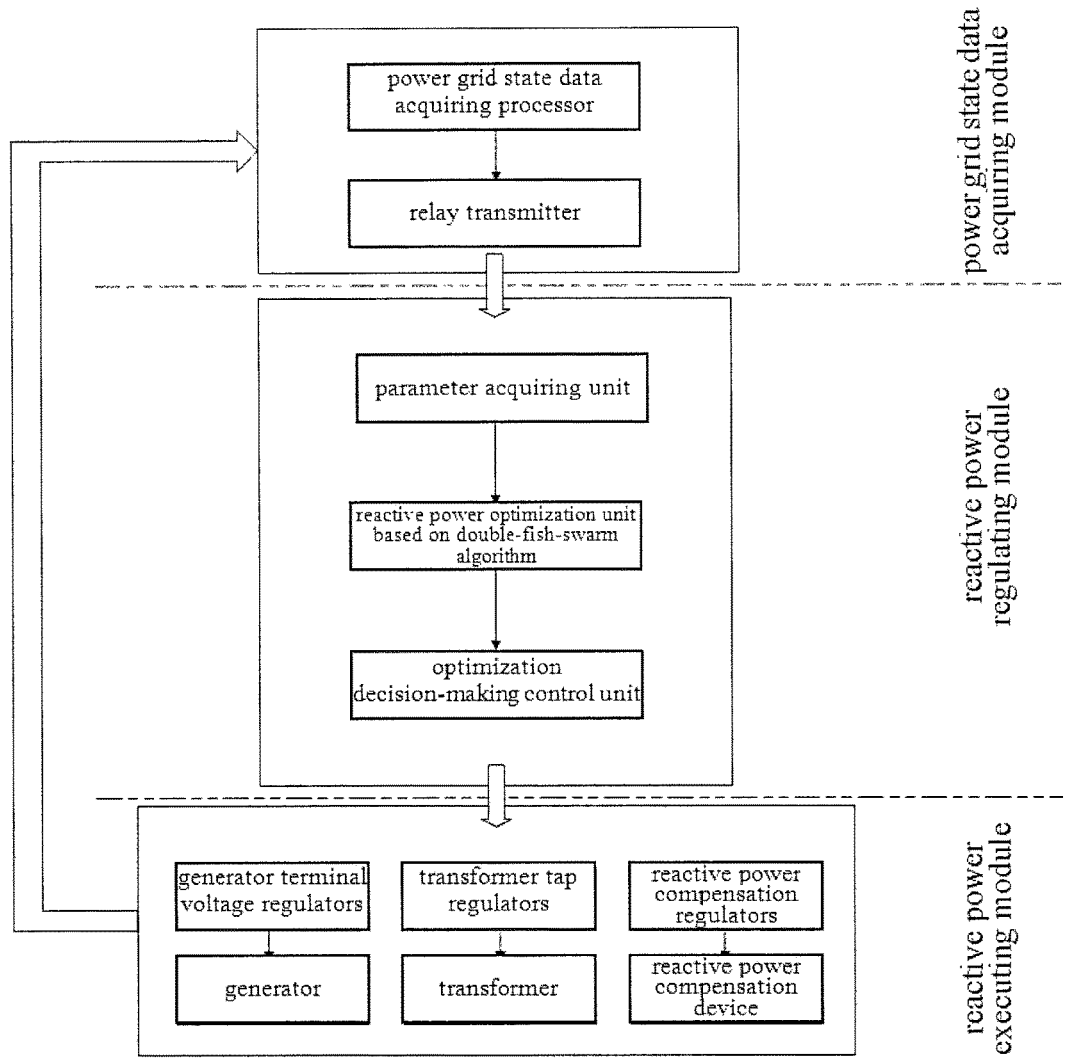
FIG. 2 is a structure diagram of the reactive power optimization system of power grid based on the double-fish-swarm algorithm in the preferred embodiment of the present invention.

The reactive power optimization system of a power grid based on a double-fish-swarm algorithm, as shown in FIG. 2, includes a power grid state data acquiring module, a reactive power regulating module and a reactive power executing module, the power grid state data acquiring module is connected to the reactive power regulating module, the reactive power regulating module is connected to the reactive power executing module, wherein the power grid state data acquiring module includes a power grid state data acquiring processor and a relay transmitter;

the reactive power regulating module is a control terminal;

the reactive power executing module includes generator terminal voltage regulators, transformer tap regulators and reactive power compensation regulators;

the input end of the power grid state data acquiring processor is connected with a power grid; the output end of the power grid state data acquiring processor is connected with the input end of the relay transmitter; the output end of the relay transmitter is connected with the input end of the control terminal; the output end of the control terminal is connected with the input end of each of the generator terminal voltage regulators, the input end of each of the transformer tap regulators and the input end of each of the reactive power compensation regulators; the output end of each of the generator terminal voltage regulators is connected with a corresponding generator in the power grid; the output end of each of the transformer tap regulators is connected with a corresponding transformer in the power grid; and the output end of each of the reactive power compensation regulators is connected with a corresponding reactive power compensation device in the power grid.

In the embodiment, the power grid state data acquiring processor of which the type is DCZL23-CL156N is used for acquiring the current network information of the power grid and judging whether the current network information meets the optimal state required by the power grid or not; and if the current network information cannot meet the optimal state required by the power grid, the current network information is transmitted to the relay transmitter, wherein the current network information includes power grid node information, branch information, generator information, transformer information and reactive power compensation device information.

In the embodiment, the transformer information and the corresponding branch information obtained according to the IEEE10 node system as shown in FIG. 1 are as shown in Table 1 and Table 2, the load parameters are as shown in Table 3, and the branch parameters are as shown in Table 4.

TABLE 1

Two-winding transformer information and corresponding branch information

| Transformer Branch | R | X | Transformation ratio |
|---|---|---|---|
| 2-6 | 0 | 0.0625 | 1.0 |
| 3-8 | 0 | 0.0586 | 1.0 |

In the table, R is resistance and X is reactance.

TABLE 2

Three-winding transformer information and corresponding branch information

| Transformer Branch | High-Voltage Impedance (R/X) | Medium-Voltage Impedance (R/X) | Low-Voltage Impedance (R/X) |
|---|---|---|---|
| 1-4-10 | 0.0011 0.085 | 0.0037 −0.015 | 0.0015 0.095 |

TABLE 3

Load parameters

| Node Number | $P_{load}$ | $Q_{load}$ |
|---|---|---|
| 5 | 1.25 | 0.80 |
| 7 | 1.00 | 0.55 |
| 9 | 0.90 | 1.20 |

In the table, $P_{load}$ is the active power of the loads and $Q_{load}$ is the reactive power of the loads.

TABLE 4

Branch parameters

| Branch Number | First/Last Node Number | R | X | B/2 |
|---|---|---|---|---|
| 1 | 4-5 | 0.0100 | 0.085 | 0.0440 |
| 2 | 5-6 | 0.0320 | 0.161 | 0.0765 |

TABLE 4-continued

Branch parameters

| Branch Number | First/Last Node Number | R | X | B/2 |
|---|---|---|---|---|
| 3 | 6-7 | 0.0085 | 0.072 | 0.0373 |
| 4 | 7-8 | 0.0119 | 0.1008 | 0.0523 |
| 5 | 8-9 | 0.0390 | 0.170 | 0.0895 |
| 6 | 9-4 | 0.017 | 0.092 | 0.0395 |

In the embodiment, the relay transmitter of which the type is RD 980 is used for transmitting the power grid node information, the branch information, the generator information, the transformer information and the reactive power compensation device information which are acquired by the power grid state data acquiring processor and required for reactive power optimization in the network information to the control terminal.

The reactive power regulating module includes a processor that is configured to perform as a parameter acquiring unit, a double-fish-swarm algorithm-base reactive power optimization unit, and an optimization decision-making control unit, the parameter acquiring unit is connected to the reactive power optimization unit, and the reactive power optimization unit is connected to the optimization decision-making control unit;

The parameter acquiring unit is used for acquiring the power grid node information, the branch information, the generator information, the transformer information and the reactive power compensation device information transmitted by the relay transmitter and used as initial data to be optimized in the current network;

The double-fish-swarm algorithm-base reactive power optimization unit is used for establishing a mathematical model for reactive power optimization of a power system, and the acquired initial data to be optimized in the current network is optimized based on the double-fish-swarm algorithm, so that an optimal value of each of control variables in the power grid is obtained, wherein the control variables includes generator terminal voltage amplitudes, transformer adjustable ratios, and the reactive power capacity of reactive power compensation devices;

In the embodiment, a mathematical model for the reactive power optimization of the power system is established in a penalty function manner by using an alpha-method, with the minimum network loss and the optimal voltage level as the optimization objectives, as shown in the formula (1):

$$\min F = \alpha_1 \sum_{h=1}^{nl} G_{lv}[u_l^2 + u_v^2 - 2u_l u_v \cos(\theta_v - \theta_l)] + \alpha_2 \sum_{v=1}^{N_d} \left(\frac{V_v - V_v^{sp}}{\Delta V_v^{max}}\right)^2 + \lambda_u \sum_{v=1}^{N_d} \left|\frac{\Delta V_v}{V_{v,max} - V_{v,min}}\right|^2 + \lambda_q \sum_{k=1}^{N_g} \left|\frac{\Delta Q_k}{Q_{k,max} - Q_{k,min}}\right|^2 \quad (1)$$

wherein, F is an objective function of the mathematical model for reactive power optimization of a power grid, $$\Delta V_v = \begin{cases} V_v - V_{v,max} & V_v > V_{v,max} \\ 0 & V_{v,min} \le V_v \le V_{v,max} \\ V_{v,min} - V_v & V_v < V_{v,min} \end{cases},$$

-continued $$\Delta Q_k = \begin{cases} Q_k - Q_{k,max} & Q_k > Q_{k,max} \\ 0 & Q_{k,min} \leq Q_k \leq Q_{k,max} \\ Q_{k,min} - Q_k & Q_{k,min} < Q_k \end{cases}$$

1<h<nl, nl is the total number of branches in a power grid system, $G_{lv}$ is the electrical conductance of a connecting branch l–v, $\theta_v$ is the phase angle of a node v, $\theta_l$ is the phase angle of a node l, $\alpha_1$ is the weight coefficient of an objective function for minimum network loss, $\alpha_2$ is the weight coefficient of an objective function for optimum voltage, $u_l$ is the voltage of the node l, $u_v$ is the voltage of the node v, 1<v<$N_d$, $N_d$ is the total number of load nodes in the power grid system, 1<k<$N_g$, $N_g$ is the number of generators in the power grid, $V_v$ is the voltage of the node v, $V_v^{sp}$ is the set voltage value of the node v, $\Delta V_v^{max}$ is the maximum deviation value of voltage of the node v, $V_{v,max}$ is the upper limit value of the voltage of the node v, $V_{v,min}$ is the lower limit value of the voltage of the node v, $\lambda_u$ is a penalty coefficient for voltage outside tolerances of the load nodes, $\lambda_q$ is a penalty coefficient for the reactive power output outside tolerances of the generators, $Q_k$ is the reactive power output of a generator node k, $Q_{k,max}$ is the upper limit value of the reactive power output of the generator node k, and $Q_{k,min}$ is the lower limit value of the reactive power output of the generator node k.

In the embodiment, the special process for optimizing the initial data to be optimized in the current network based on the double-fish-swarm algorithm so as to obtain the optimal values of control variables in the power grid is as follows:

generating a small fish-swarm and a ferocious fish-swarm in a random manner according to the upper limit value and the lower limit value of the control variables to be optimized in the power grid, wherein the control variables include generator terminal voltage amplitudes, transformer adjustable ratios, and reactive power capacity of reactive power compensation devices;

generating a ferocious fish-swarm in a random manner according to the upper limit value and the lower limit value of the control variables to be optimized in the power grid;

initializing the optimal value of current food concentration, and displaying the initialized optimal value of current food concentration in a bulletin board: by using the reciprocal of the objective function of the mathematical model for reactive power optimization of a power grid as a value FC of food concentration, by calculating the value of food concentration in the current network in the state of initial data to be optimized, the value of the food concentration in the state of the small and artificial fish individuals, and the value of the food concentration in the state of the ferocious and artificial fish individuals, taking the maximum value of food concentration as the optimal value of current food concentration, displaying the optimal value of current food concentration in the bulletin board, and saving the state and the optimal value FC of the current food concentration;

in the embodiment, the calculation formula for the value FC of the the food concentration is as shown in the formula (2):

$$FC = 1/F \quad (2)$$

enabling the small fish-swarm to act: enabling small fish individuals to perform a foraging clustering behavior, a rear-end behavior and a protective clustering behavior according to the distance between each of the small fish individuals and ferocious fish individuals as well as the distance between the small fish individuals in the small fish-swarm, and updating the value in the bulletin board Y1;

enabling the ferocious fish-swarm to act: enabling each of the ferocious fish individuals to perform a predation behavior, a tracking behavior and a clustering behavior according to the distance between each of the ferocious fishes and the small fish individuals as well as the distance between the ferocious fish individuals in the ferocious fish-swarm, and updating Y2; and when the termination condition is achieved, taking the greater value of food concentration displayed in the bulletin boards Y1 and Y2 as well as the state thereof as optimal values so as to obtain the optimal values of the control variables, namely the optimal values of the generator terminal voltage amplitudes, the transformer adjustable ratios, and the reactive power capacity of the reactive power compensation devices.

The optimization decision-making control unit is used for transmitting the optimal values of the control variables to the reactive power executing module.

In the embodiment, the generator terminal voltage regulators of which the type is EQ1512 are used for regulating generator terminal voltages according to the optimal values of the generator terminal voltage amplitudes, obtained by the reactive power regulating module.

In the embodiment, the transformer tap regulators of which the type is TSGC2J are used for regulating transformer taps according to the optimal values of the transformer adjustable ratios, obtained by the reactive power regulating module.

In the embodiment, the reactive power compensation regulators of which the type is GLTSC are used for regulating the compensation capacity of reactive power compensators according to the optimal values of the reactive power capacity of the reactive power compensation devices, obtained by the reactive power regulating module.

Figure 3:
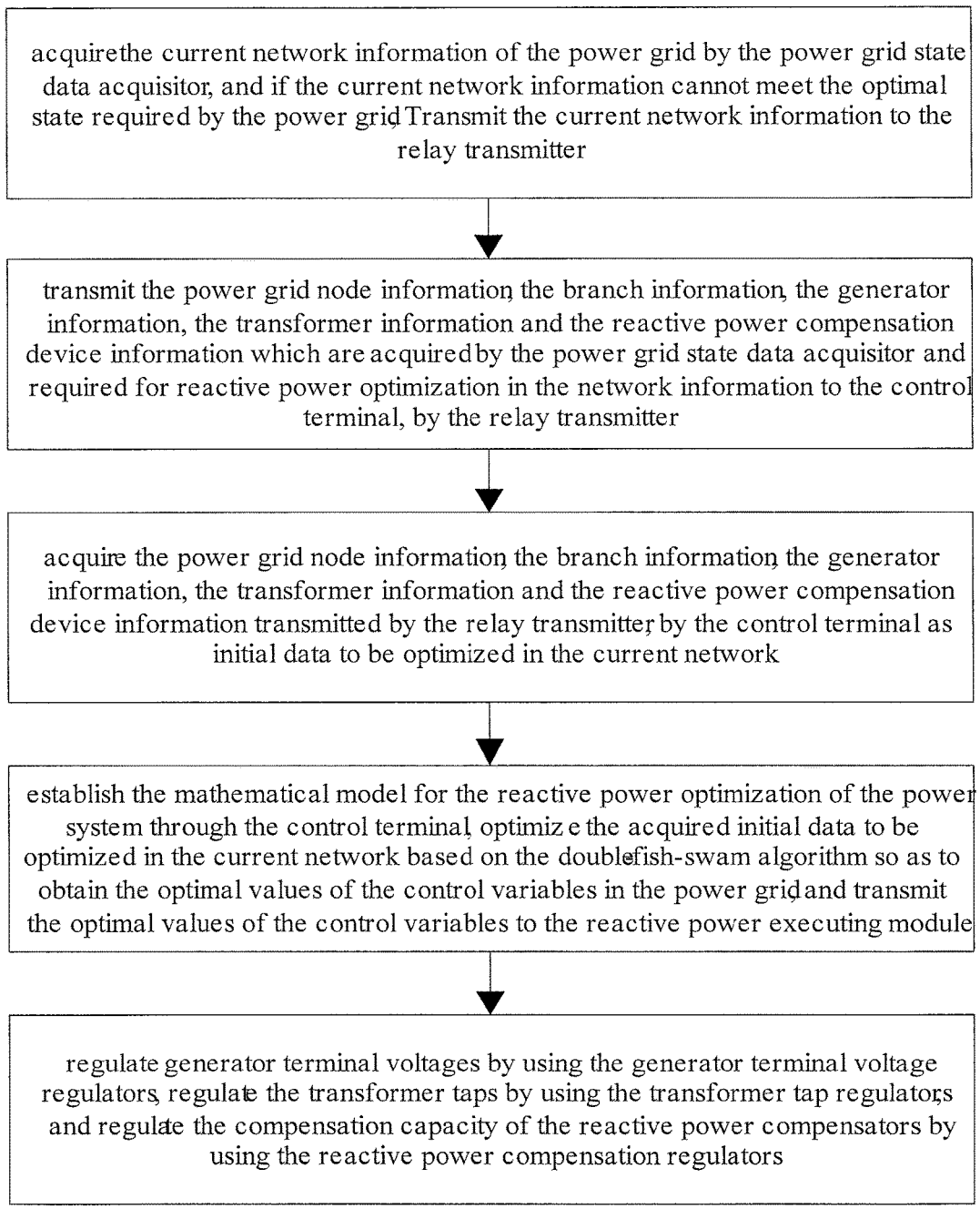
FIG. 3 is a flow chart of the reactive power optimization method of the power grid based on the double-fish-swarm algorithm in the preferred embodiment of the present invention.
Figure 4:
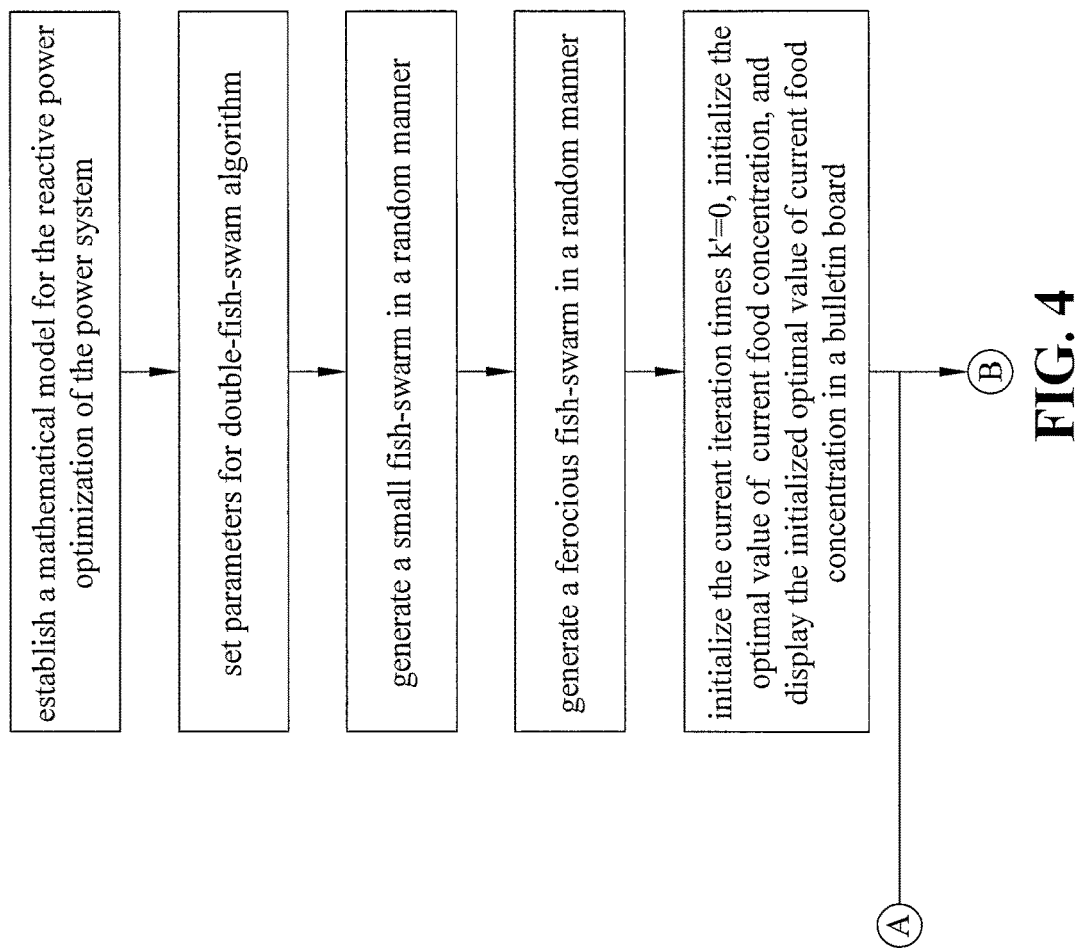
FIG. 4 is a flow chart of a process for optimizing the initial data to be optimized in the current network based on the double-fish-swarm algorithm so as to obtain the optimal values of control variables in the power grid in the preferred embodiment of the present invention.
Figure 4:
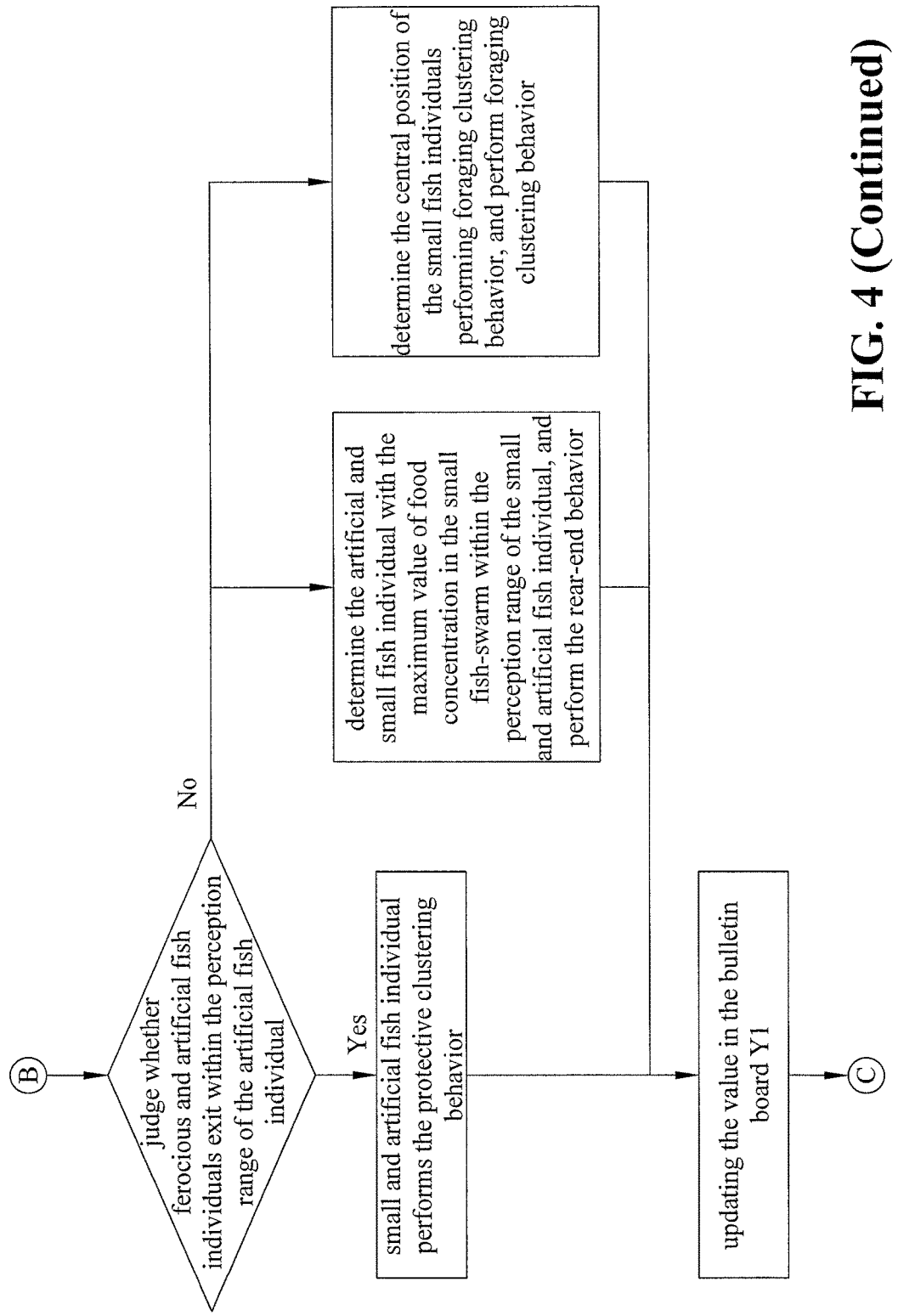
Figure 4:
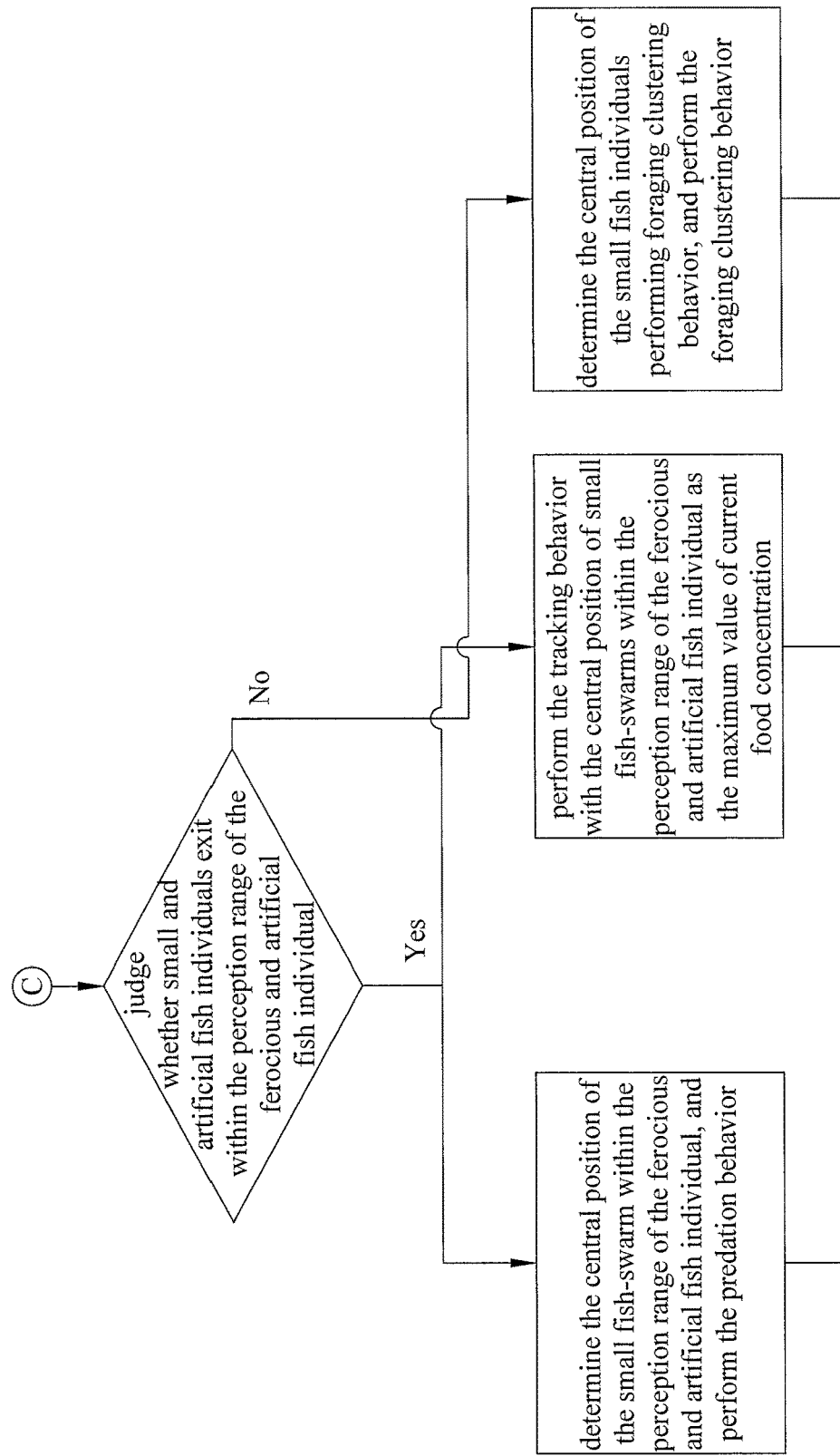
Figure 4:
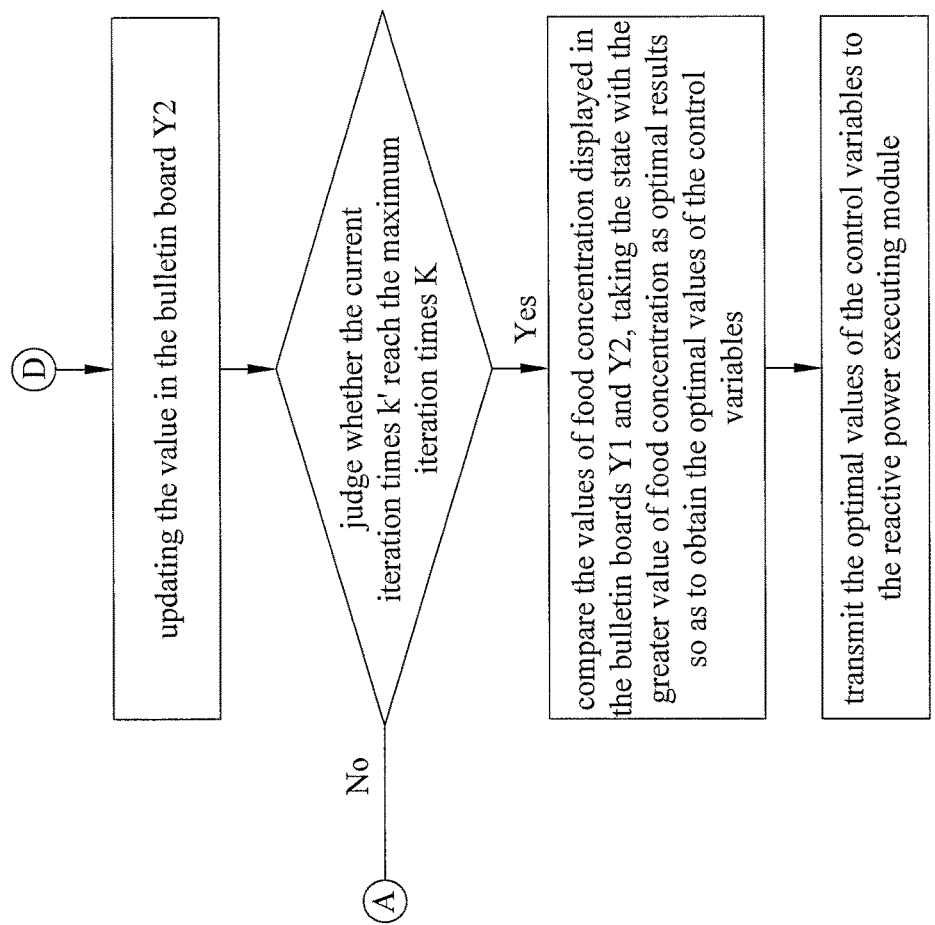

A method for reactive power optimization of a power grid by adopting the reactive power optimization system of a power grid based on the double-fish-swarm algorithm, as shown in FIG. 3, includes the following steps that step 1: acquiring the current network information of the power grid and judging whether the current network information meets the optimal state required by the power grid or not by the power grid state data acquiring processor; and if the current network information cannot meet the optimal state required by the power grid, transmitting the current network information to the relay transmitter;

step 2: transmitting the power grid node information, the branch information, the generator information, the transformer information and the reactive power compensation device information which are acquired by the power grid state data acquiring processor and required for reactive power optimization in the network information to the control terminal, by the relay transmitter;

step 3: acquiring the power grid node information, the branch information, the generator information, the transformer information and the reactive power compensation device information transmitted by the relay transmitter and used as initial data to be optimized in the current network, by the control terminal, wherein in the embodiment, the initial data to be optimized in the current network includes the node information, the branch information, the number of generators as well as the upper limit and the lower limit of each of the generator terminal voltage amplitudes $U_G$, the number of transformers as well as the upper limit and the lower limit of each of the transformer adjustable ratios $K_T$, the number of switching groups of the reactive power compensation devices, and the upper limit and the lower limit of each of the reactive power capacity $Q_c$ of the reactive power compensation devices;

step 4: establishing the mathematical model for the reactive power optimization of the power system through the control terminal, optimizing the acquired initial data to be optimized in the current network based on the double-fish-swarm algorithm so as to obtain the optimal values of the control variables in the power grid, and transmitting the optimal values of the control variables to the reactive power executing module, as shown in FIG. 4:

step 4.1: establishing a mathematical model for the reactive power optimization of the power system by using an alpha-method in a weighted sum method, with the minimum network loss and the optimal voltage level as the optimization objectives;

step 4.2: setting parameters for the double-fish-swarm algorithm: the size N1 of the small fish-swarm, the size N2 of the ferocious fish-swarm, the perception range Visual1 of the small fish-swarm, the perception range Visual2 of the ferocious fish-swarm, the shift step length Step1 of the small fish-swarm, the shift step length Step2 of the ferocious fish-swarm, the crowding factor $\delta_1$ of the small fish-swarm, the crowding factor $\delta_2$ of the ferocious fish-swarm, the attempt times try_number1 of the small fish-swarm, the attempt times try_number2 of the ferocious fish-swarm, and the maximum iteration times K>0, and in the embodiment, the maximum iteration times K is 100;

step 4.3: generating a small fish-swarm in a random manner according to the upper limit value and the lower limit value of the control variables to be optimized in the power grid:

step 4.3.1: initializing the number $t_1=0$ of the generated small fishes;

step 4.3.2: generating small and artificial fish individuals in a random manner according to the upper limit value and the lower limit value of the control variables to be optimized in the power grid, as shown in the formula (3):

$$X=[U_{G11},U_{G12},\ldots U_{G1g},K_{T11},K_{T12},\ldots,K_{T1t},Q_{C11},Q_{C12},\ldots,Q_{C1c}]=[x_1,x_2,\ldots x_s,\ldots,X_S] \quad (3)$$

wherein, X is the value sequence of the control variables of the small and artificial fish individuals, $x_s=x_{s\ min}+\text{rand}(g)\times(x_{x\ max}-x_{s\ min})$, rand(g) is a random number of an interval (0, 1), $x_{s\ min}$ the lower limit value of the corresponding control variables, $x_{s\ max}$ is the upper limit value of the corresponding control variable, $U_{G1g}$ is the generator terminal voltage amplitude in the randomly generated small and artificial fish individuals, $K_{T1t}$ is the transformer adjustable ratio in the randomly generated small and artificial fish individuals, $Q_{C1c}$ is the reactive power capacity of the reactive power compensation devices in the randomly generated small and artificial fish individuals, $x_s$ is the control variables of the randomly generated small fish individuals, $1 \le s \le S$, $S=N_g+N_t+N_c$, $N_g$ is the number of the generators in the power grid, $N_t$ is the number of the transformers in the power grid, and $N_c$ is the number of the reactive power compensation devices in the power grid;

step 4.3.3: performing power flow calculation on the control variables in the randomly generated small fish individuals in the step 4.3.2 by using a P-Q decomposition method. If the power flow value of the current small fish individual is converged, retaining the small fish individual, enabling $t_1=t_1+1$, and executing the step 4.3.4; or else, not retaining the small fish individual, and returning to the step 4.3.2;

step 4.3.4: if the number $t_1$ of the current generated small fish individuals achieves the scale N1 of the small fish-swarm, obtaining a current small fish-swarm, and executing the step 4.4; or else, returning to the step 4.3.2;

step 4.4: generating a ferocious fish-swarm in a random manner according to the upper limit value and the lower limit value of the control variables to be optimized in the power grid:

step 4.4.1: initializing the number $t_2=0$ of the generated ferocious fishes;

step 4.4.2: generating ferocious and artificial fish individuals in a random manner according to the upper limit value and the lower limit value of the control variables to be optimized in the power grid, as shown in the formula (4):

$$W=[U_{G21},U_{G22},\ldots,U_{G2g},K_{T21},K_{T22},\ldots,K_{T2t},Q_{C21},Q_{C22},\ldots,Q_{C2c}]=[w_1,w_2,\ldots,w_s,\ldots,w_S] \quad (4)$$

step 4.4.3: performing power flow calculation on the control variables in the randomly generated small ferocious individuals in the step 4.4.2 by using a P-Q decomposition method. If the power flow value of the current ferocious fish individual is converged, retaining the ferocious fish individual, enabling $t_2=t_2+1$, and executing the step 4.4.4; or else, not retaining the ferocious fish individual, and returning to the step 4.4.2;

step 4.4.4: if the number $t_2$ of the current ferocious fish individuals achieves the scale N2 of the ferocious fish-swarm, obtaining a current small fish-swarm, and executing the step 4.5; or else, returning to the step 4.4.2;

step 4.5: initializing the current iteration times k'=0, initializing the optimal value of current food concentration, and displaying the initialized optimal value of current food concentration in a bulletin board: by using the reciprocal of the objective function of the mathematical model for reactive power optimization of a power grid as a value FC of food concentration, by calculating the value of food concentration in the current network in the state of initial data to be optimized, the value of the food concentration in the state of the small and artificial fish individuals, and the value of the food concentration in the state of the ferocious and artificial fish individuals, taking the maximum value of food concentration as the optimal value of current food concentration, displaying the optimal value of current food concentration in the bulletin board, and saving the state and the optimal value FC of the current food concentration;

step 4.6: enabling the small fish-swarm to act: enabling small fish individuals to perform a foraging clustering behavior, a rear-end behavior and a protective clustering behavior, and updating the value in the bulletin board Y1;

step 4.6.1: determining the distance between the current i th small and artificial fish individual $X_i$ and each of the ferocious and artificial fish individuals $W_j$, as shown in the formula (5):

$$D=\{D_{i1},D_{i2},\ldots,D_{ij},\ldots,D_{iN2}\} \quad (5)$$

wherein, $D_{ij}=\|X_i-W_j\|$, $1<j<N2$, N2 is the number of the ferocious and artificial fish individuals;

step 4.6.2: if the distance $D_{ij} \le$ Visual1 between the current i th small and artificial fish individual $X_i$ and each of the ferocious and artificial fish individuals $W_j$, executing the step 4.6.3; or else, executing the step 4.6.5;

step 4.6.3: determining the total number n of the small fish individuals within the perception range of the i th small fish individual $X_i$, to determine a protective clustering safe position $X_{safe}$, and enabling the i th small fish individual $X_i$ to perform the protective clustering behavior so as to obtain an update value $X_{i_{next1}}$ of the i th small fish individual performing the protective clustering behavior, wherein in the embodiment, the small fish individuals $X_i$ within the perception range of the i th small fish individual, is determined, namely the small fish individuals $X_{in}$ meeting the formula (6):

$$d_{in}=\|X_i-X_{in}\| \leq \text{Visual1} \tag{6}$$

in the embodiment, the calculation formula for the protective clustering safe position $X_{safe}$ is as shown in the formula (7):

$$X_{safe}=(X_{i1}+X_{i2}+\ldots+X_{in})\times\lambda/n \tag{7}$$

wherein $\lambda=(n+p)/n$ is escape factors, p is the total number of the ferocious fish individuals within the perception range Visual1 of the small fish individual $X_i$, $X_{in}$ is the number of the small fish individuals within the perception range of the small fish individuals $X_i$, the escape factors $\lambda$ are introduced to enable the small fish-swarm to be collected to the safe position away from the ferocious fish-swarm as possible when performing the protective clustering behavior;

in the embodiment, the update value $X_{i_{next1}}$ of the i th small fish individual performing the protective clustering behavior is shown as the formula (8):

$$X_{i_{next1}}=X_i+\text{rand}(g)\times\text{Step1}\times\delta_1\times(X_{safe}-X_i)/\|X_{safe}-X_i\| \tag{8}$$

step 4.6.4: judging whether the update value $X_{i_{next1}}$ of the current small and artificial fish individual performing the protective clustering behavior meets a constraint condition and the power flow is converged; if yes, recording the state of the update value $X_{i_{next1}}$, calculating the value of food concentration, updating the value in the bulletin board Y1, and executing the step 4.7; or else, returning to the step 4.6.3;

in the embodiment, the constraint conditions are the corresponding number of generators as well as the upper limit and the lower limit of each of the generator terminal voltage amplitudes $U_G$, the number of transformers as well as the upper limit and the lower limit of each of the transformer adjustable ratios $K_t$, the number of switching groups of the reactive power compensation devices, and the upper limit and the lower limit of each of the reactive power capacity $Q_c$ of the reactive power compensation devices;

step 4.6.5: determining the small fish individual $X_{j'}$ with the maximum value $FC_{j'}$ of food concentration in the small fish-swarm within the perception range of the i th small fish individual $X_i$, and enabling the i th small fish individual $X_i$ to perform the rear-end behavior so as to obtain an update value $X_{i_{next2}}$ of the i th small fish individual $X_i$ performing the rear-end behavior, wherein in the embodiment, the update value $X_{i_{next2}}$ of the i th small and artificial fish individual $X_i$ performing the rear-end behavior is shown as the formula (9):

$$X_{i_{next2}}=X_i+\text{rand}(g)\times\text{Step1}\times\delta_1\times(X_{j'}-X_i)/\|X_{j'}-X_i\| \tag{9}$$

step 4.6.6: determining the total number n of the small fish individuals within the perception range of the i th small fish individual $X_i$ to determine the central position $X_{c1}$ of the small fish individuals performing foraging clustering behavior, and enabling the i th small fish individual $X_i$ to perform the foraging clustering behavior so as to obtain an update value $X_{i_{next3}}$ of the i th small fish individual performing the foraging clustering behavior, wherein in the embodiment, the calculation formula for the central position $X_{c1}$ of the fish individuals performing the foraging clustering behavior is as shown in the formula (10):

$$X_{c1}=(X_{i1}+X_{i2}+\ldots+X_{in})/n \tag{10}$$

in the embodiment, the update value $X_{i_{next3}}$ of the i th small fish individual performing the foraging clustering behavior is shown as the formula (11):

$$X_{i_{next3}}=X_i+\text{rand}(g)\times\text{Step1}\times\delta_1\times(X_{c1}-X_i)/\|X_{c1}-X_i\| \tag{11}$$

step 4.6.7: judging whether the update value $X_{i_{next2}}$ of the current small and artificial fish individual and the update value $X_{i_{next3}}$ performing the foraging clustering behavior of the small and artificial fish individual performing the foraging clustering behavior meet constraint conditions and the power flow is converged; if yes, recording the state of the update value $X_{i_{next2}}$ and the state of the update value $X_{i_{next3}}$, calculating the value of food concentration, updating the value in the bulletin board Y1, and executing the step 4.7; or else, returning to the step 4.6.5.

step 4.7: enabling the ferocious fish-swarm to act: enabling each of the ferocious fish individuals to perform a predation behavior, a tracking behavior and a clustering behavior according to the distance between each of the ferocious fish individuals and the small fish individuals in the ferocious fish-swarm as well as the distance between of the ferocious fish individuals, and updating the value Y2 of the food concentration of the ferocious fish-swarm performing the corresponding behavior in the bulletin board;

step 4.7.1: determining the distance between the current i'th ferocious fish individual $W_{i'}$ and each of the small fish individuals $X_{j''}$, as shown in the formula (12):

$$L=\{L_{i'1},L_{i'2},\ldots,L_{i'j''},\ldots,L_{i'N1}\} \tag{12}$$

wherein, $L_{i'j''}=\|W_{i'}-X_{j''}\|$, $1 \leq j'' \leq N1$, N1 is the number of small fish individuals;

step 4.7.2: if $L_{i'j''} \leq \text{Visual2}$, executing the step 4.7.3; or else, executing the step 4.7.6;

step 4.7.3: determining the total number m of the small fish individuals within the perception range of the current i'th ferocious fish individual $W_{i'}$, enabling the i'th ferocious fish individual $W_{i'}$ to perform the predation behavior with a central position $X_{c2}$ of small fish-swarm within the perception range of the i'th ferocious fish individual $W_{i'}$ as the maximum value of current food concentration, and updating the i'th ferocious fish individual $W_{i'}$ as the central position $X_{c2}$ of the small fish-swarm so as to obtain an update value $W_{i'_{next1}}=X_{c2}$ of the i'th ferocious fish individual $W_{i'}$ performing the predation behavior, wherein in the embodiment, the calculation formula for the central position $X_{c2}$ of small fish-swarms within the perception range of the i'th ferocious fish individual $W_{i'}$ is shown as the formula (13):

$$X_{c2}=(X_{i'1}+X_{i'2}+\ldots+X_{i'm})/m \tag{13}$$

wherein, $X_{i'm}$ is the small fish individuals within the perception range of the ferocious fish individual $W_{i'}$;

step 4.7.4: enabling the i'th ferocious fish individual $W_{i'}$ to perform the tracking behavior with the central position $X_{c2}$ of small fish-swarms within the perception range of the current i'th ferocious fish individual $W_{i'}$ as the maximum value of current food concentration so as to obtain an update value $W_{i'_{next2}}$ of the i'th ferocious fish individual $W_{i'}$ performing the tracking behavior;

in the embodiment, the update value $W_{i'_{next2}}$ of the i'th ferocious fish individual $W_{i'}$ performing the tracking behavior is shown as the formula (14):

$$W_{i'_{next2}}=W_{i'}+\text{rand}(g)\times\text{Step2}\times\delta_2\times(X_{c2}-W_{i'})/\|X_{c2}-W_{i'}\| \tag{14}$$

step 4.7.5: judging whether the update value $W_{i'_{next1}}$ of the current ferocious fish individual $W_{i'}$ performing the foraging behavior and the update value $W_{i'_{next2}}$ of the ferocious fish individual $W_{i'}$ performing the tracking behavior meet constraint conditions and the power flow is converged; if yes, recording the state of the update value $W_{i'next1}$ and the state of the update value $W_{i'next2}$, calculating the value of the food concentration, updating the value in the bulletin board Y2, and executing the step 4.7.6; or else, returning to the step 4.7.3;

step 4.7.6: determining the total number r of the ferocious fish individuals within the perception range of the i'th ferocious fish individual $W_{i'}$ to determine the central position $W_c$ of the ferocious fish individuals preforming the clustering behavior, and enabling the i'th ferocious fish individual $W_{i'}$ to perform the clustering behavior so as to obtain an update value $W_{i'next3}$ of the i'th ferocious fish individual $W_{i'}$ performing the clustering behavior, wherein in the embodiment, the calculation formula for the central position $W_c$ of the fish individuals performing the foraging clustering behavior is as shown in the formula (15):

$$W_c = (W_{i'1} + W_{i'2} + \ldots + W_{i'r})/r \tag{15}$$

wherein, $W_{i'r}$ is the ferocious fish individuals within the perception range of the i'th ferocious fish individual $W_{i'}$, in the embodiment, the update value $W_{i'next3}$ of the i'th ferocious fish individual $W_{i'}$ performing the clustering behavior is shown as the formula (16):

$$W_{i'next1} = W_{i'} + \text{rand}(g) \times \text{Step2} \times \delta_2 \times (W_c - W_{i'})/\|W_c - W_{i'}\| \tag{16}$$

step 4.7.7: judging whether the update value $W_{i'next3}$ of the current ferocious fish individual $W_{i'}$ performing the clustering behavior meets the constraint condition and the power flow is converged; if yes, recording the state of the update value $W_{i'next3}$, calculating the value of the food concentration, updating the value in the bulletin board Y2, and executing the step 4.8; or else, returning to the step 4.7.6.

step 4.8: judging whether the current iteration times k' reach the maximum iteration times K, if yes, executing the step 4.9; or else, k'=k'+1, and returning to the step 4.6;

step 4.9: taking the greater value of food concentration displayed in the bulletin boards Y1 and Y2 as well as the state thereof as optimal values so as to obtain the optimal values of the control variables, namely the optimal values of the generator terminal voltage amplitudes, the transformer adjustable ratios, and the reactive power capacity of the reactive power compensation devices; and step 4.10: transmitting the optimal values of the control variables to the reactive power executing module; and step 5: regulating generator terminal voltages by using the generator terminal voltage regulators according to the optimal values of the generator terminal voltage amplitudes, regulating the transformer taps by using the transformer tap regulators according to optimal values of the transformer adjustable ratios, and regulating the compensation capacity of the reactive power compensators by using the reactive power compensation regulators according to the optimal values of the reactive power capacity of the reactive power compensation devices.

In the embodiment, a particle swarm algorithm, a genetic algorithm and the double-fish-swarm algorithm in the present invention are respectively used to perform reactive power optimization simulation on the system. 100 iterations and 10 simulation experiments are performed for each of the three algorithms. The comparison of simulation results are as shown in Table 5 and Table 6:

TABLE 5

Comparison of node voltages before and after optimization by using particle swarm algorithm, the genetic algorithm and the double-fish-swarm algorithm in the present invention

| Node Name | Voltage before Optimization | Voltage after Optimization by Particle Swarm Algorithm | Voltage after Optimization by Genetic Algorithm | Voltage after Optimization by Double-Fish-Swarm Algorithm |
|---|---|---|---|---|
| 1 | 1.030 | 1.045 | 1.056 | 1.100 |
| 2 | 1.025 | 1.036 | 1.040 | 1.100 |
| 3 | 1.025 | 1.036 | 1.040 | 1.100 |
| 4 | 0.980 | 1.011 | 1.015 | 1.031 |
| 5 | 1.000 | 1.022 | 1.055 | 1.127 |
| 6 | 1.017 | 1.045 | 1.056 | 1.142 |
| 7 | 0.991 | 1.023 | 1.061 | 1.133 |
| 8 | 1.007 | 1.015 | 1.026 | 1.047 |
| 9 | 0.910 | 1.012 | 1.035 | 1.074 |
| 10 | 1.003 | 1.015 | 1.020 | 1.037 |

TABLE 6

Comparison of system network loss before and after optimization by using the particle swarm algorithm, the genetic algorithm and the double-fish-swarm algorithm in the present invention

| Network Loss before Optimization (MW) | Network Losses after Optimization by Particle Swarm Algorithm (MW) | Network Losses after Optimization by Genetic Algorithm (MW) | Network Losses after Optimization by Double-Fish-Swarm Algorithm (MW) |
|---|---|---|---|
| 6.482560 | 5.852618 | 5.224537 | 4.607137 |

According to Table 5 and Table 6, through the comparative analysis after compensation, compared with the particle swarm algorithm and the genetic algorithm, the double-fish-swarm algorithm achieves a better effect in the process of reactive power optimization, the voltage quality is obviously improved, and the network loss is reduced to the maximum, so that the reactive power distribution is improved, the safety and stability of the system are guaranteed, and the results show that the double-fish-swarm algorithm has good feasibility and practicability.

What is claimed is:

1. A reactive power optimization system of a power grid based on a double-fish-swarm algorithm, comprising a power grid state data acquiring module, a reactive power regulating module and a reactive power executing module, the power grid state data acquiring module connected to the reactive power regulating module, the reactive power regulating module connected to the reactive power executing module, wherein the power grid state data acquiring module comprises a power grid state data acquiring processor and a relay transmitter;

the reactive power regulating module is a control terminal;

the reactive power executing module comprises generator terminal voltage regulators, transformer tap regulators and reactive power compensation regulators;

an input end of the power grid state data acquiring processor is connected with a power grid; an output end of the power grid state data acquiring processor is connected with the input end of the relay transmitter; the output end of the relay transmitter is connected with the input end of the control terminal; the output end of the control terminal is connected with the input end of each of the generator terminal voltage regulators, the input end of each of the transformer tap regulators and the input end of each of the reactive power compensation regulators; the output end of each of the generator terminal voltage regulators is connected with a corresponding generator in the power grid; the output end of each of the transformer tap regulators is connected with a corresponding transformer in the power grid; and the output end of each of the reactive power compensation regulators is connected with a corresponding reactive power compensation device in the power grid;

the power grid state data acquiring processor is used for acquiring the current network information of the power grid and judging whether the current network information meets the optimal state required by the power grid or not; and if the current network information cannot meet the optimal state required by the power grid, the current network information is transmitted to the relay transmitter, wherein the current network information includes power grid node information, branch information, generator information, transformer information and reactive power compensation device information;

the relay transmitter is used for transmitting the power grid node information, the branch information, the generator information, the transformer information and the reactive power compensation device information which are acquired by the power grid state data acquiring processor and required for reactive power optimization in the network information to the control terminal;

the reactive power regulating module comprises a processor configured to function as a parameter acquiring unit, a double-fish-swarm algorithm-base reactive power optimization unit, and an optimization decision-making control unit, the parameter acquiring unit connected to the reactive power optimization unit, and the reactive power optimization unit connected to the optimization decision-making control unit;

the parameter acquiring unit is used for acquiring the power grid node information, the branch information, the generator information, the transformer information and the reactive power compensation device information transmitted by the relay transmitter and used as initial data to be optimized in the current network;

the double-fish-swarm algorithm-base reactive power optimization unit is used for establishing a mathematical model for reactive power optimization of a power system, and the acquired initial data to be optimized in the current network is optimized based on the double-fish-swarm algorithm, so that an optimal value of each of control variables in the power grid is obtained, wherein the control variables comprise generator terminal voltage amplitudes, transformer adjustable ratios, and the reactive power capacity of reactive power compensation devices;

the optimization decision-making control unit is used for transmitting optimal values of the control variables to the reactive power executing module;

the generator terminal voltage regulators are used for regulating generator terminal voltages according to the optimal values of the generator terminal voltage amplitudes, obtained by the reactive power regulating module;

the transformer tap regulators are used for regulating transformer taps according to the optimal values of the transformer adjustable ratios, obtained by the reactive power regulating module; and the reactive power compensation regulators are used for regulating the compensation capacity of reactive power compensators according to the optimal values of the reactive power capacity of the reactive power compensation devices, obtained by the reactive power regulating module.

2. The reactive power optimization system of a power grid based on the double-fish-swarm algorithm according to claim 1, wherein the mathematical model for establishing the reactive power optimization of the power system is shown as follows:

$$\min F = \alpha_1 \sum_{h=1}^{nl} G_{lv}[u_l^2 + u_v^2 - 2u_l u_v \cos(\theta_v - \theta_l)] + \alpha_2 \sum_{v=1}^{N_d} \left(\frac{V_v - V_v^{sp}}{\Delta V_v^{max}}\right)^2 +$$

$$\lambda_u \sum_{v=1}^{N_d} \left|\frac{\Delta V_v}{V_{v,max} - V_{v,min}}\right|^2 + \lambda_q \sum_{k=1}^{N_g} \left|\frac{\Delta Q_k}{Q_{k,max} - Q_{k,min}}\right|^2,$$

wherein, F is an objective function of the mathematical model for reactive power optimization of a power grid, $$\Delta V_v = \begin{cases} V_v - V_{v,max} & V_v > V_{v,max} \\ 0 & V_{v,min} \le V_v \le V_{v,max} \\ V_{v,min} - V_v & V_v < V_{v,min} \end{cases},$$

$$\Delta Q_k = \begin{cases} Q_k - Q_{k,max} & Q_k > Q_{k,max} \\ 0 & Q_{k,min} \le Q_k \le Q_{k,max} \\ Q_{k,min} - Q_k & Q_{k,min} < Q_k \end{cases},$$

$1<h<nl$, nl is the total number of branches in a power grid system, $G_{lv}$ is the electrical conductance of a connecting branch l–v, $\theta_v$ is the phase angle of a node v, $\theta_l$ is the phase angle of a node l, $\alpha_1$ is the weight coefficient of an objective function for minimum network loss, $\alpha_2$ is the weight coefficient of an objective function for optimum voltage, $u_l$ is the voltage of the node l, $u_v$ is the voltage of the node v, $1<v<N_d$, $N_d$ is the total number of load nodes in the power grid system, $1<k<N_g$, $N_g$ is the number of generators in the power grid, $V_v$ is the voltage of the node v, $V_v^{sp}$ is the set voltage value of the node v, $\Delta V_v^{max}$ is the maximum deviation value of voltage of the node v, $V_{v,max}$ is the upper limit value of the voltage of the node v, $V_{v,min}$ is the lower limit value of the voltage of the node v, $\lambda_u$ is a penalty coefficient for voltage outside tolerances of the load nodes, $\lambda_q$ is a penalty coefficient for the reactive power output outside tolerances of the generators, $Q_k$ is the reactive power output of a generator node k, $Q_{k,max}$ is the upper limit value of the reactive power output of the generator node k, and $Q_{k,min}$ is the lower limit value of the reactive power output of the generator node k.

3. The reactive power optimization system of a power grid based on the double-fish-swarm algorithm according to claim 2, wherein a specific process for optimizing the acquired initial data to be optimized in the current network based on the double-fish-swarm algorithm so as to obtain the optimal values of the control variables in the power grid comprises the steps of:

generating a small fish-swarm and a ferocious fish-swarm in a random manner according to the upper limit value and the lower limit value of the control variables to be optimized in the power grid;

initializing the optimal value of current food concentration, and displaying the initialized optimal value of current food concentration in a bulletin board: by using the reciprocal 1/F of the objective function of the mathematical model for reactive power optimization of a power grid as a value FC of food concentration, calculating the value of food concentration in the current network and of small fishes and ferocious fishes under an initial data condition, taking the maximum value of food concentration as the optimal value of current food concentration, displaying the optimal value of current food concentration in the bulletin board, and saving the state and the current value FC;

enabling the small fish-swarm to act: enabling small fish individuals to perform a foraging clustering behavior, a rear-end behavior and a protective clustering behavior according to the distance between each of the small fish individuals and ferocious fish individuals as well as the distance between the small fish individuals in the small fish-swarm, and updating the value in the bulletin board Y1;

enabling the ferocious fish-swarm to act: enabling each of the ferocious fish individuals to perform a predation behavior, a tracking behavior and a clustering behavior according to the distance between each of the ferocious fishes and the small fish individuals as well as the distance between the ferocious fish individuals in the ferocious fish-swarm, and updating the value in the bulletin board Y2; and when iteration times achieve the maximum iteration times, taking the greater values of food concentration displayed in the bulletin boards Y1 and Y2 as well as the state thereof as optimal results so as to obtain the optimal values of the control variables, namely the optimal values of the generator terminal voltage amplitudes, the transformer adjustable ratios, and the reactive power capacity of the reactive power compensation devices.

4. A method for reactive power optimization of a power grid by adopting the reactive power optimization system of a power grid based on the double-fish-swarm algorithm according to claim 3, comprising the steps of:

step 1: acquiring the current network information of the power grid state data and judging whether the current network information meets the optimal state required by the power grid or not by the power grid state data acquisitor; and if the current network information cannot meet the optimal state required by the power grid, transmitting the current network information to the relay transmitter;

step 2: transmitting the power grid node information, the branch information, the generator information, the transformer information and the reactive power compensation device information which are acquired by the power grid state data acquiring processor and required for reactive power optimization in the network information to the control terminal, by the relay transmitter;

step 3: acquiring the power grid node information, the branch information, the generator information, the transformer information and the reactive power compensation device information transmitted by the relay transmitter, by the control terminal as initial data to be optimized in the current network;

step 4: establishing the mathematical model for the reactive power optimization of the power system through the control terminal, optimizing the acquired initial data to be optimized in the current network based on the double-fish-swarm algorithm so as to obtain the optimal values of the control variables in the power grid, and transmitting the optimal values of the control variables to the reactive power executing module; and step 5: regulating generator terminal voltages by using the generator terminal voltage regulators according to the optimal values of the generator terminal voltage amplitudes, regulating the transformer taps by using the transformer tap regulators according to optimal values of the transformer adjustable ratios, and regulating the compensation capacity of the reactive power compensators by using the reactive power compensation regulators according to the optimal values of the reactive power capacity of the reactive power compensation devices.

5. The method for reactive power optimization of a power grid based on the double-fish-swarm algorithm according to claim 4, wherein the step 4 comprises the steps of:

step 4.1: establishing a mathematical model for the reactive power optimization of the power system by using an alpha-method, with the minimum network loss and the optimal voltage level as the optimization objectives:

$$\min F = \alpha_1 \sum_{h=1}^{nl} G_{lv}[u_l^2 + u_v^2 - 2u_l u_v \cos(\theta_v - \theta_l)] + \alpha_2 \sum_{v=1}^{N_d} \left(\frac{V_v - V_v^{sp}}{\Delta V_v^{max}}\right)^2 +$$

$$\lambda_u \sum_{v=1}^{N_d} \left|\frac{\Delta V_v}{V_{v,max} - V_{v,min}}\right|^2 + \lambda_q \sum_{k=1}^{N_g} \left|\frac{\Delta Q_k}{Q_{k,max} - Q_{k,min}}\right|^2;$$

step 4.2: setting parameters for the double-fish-swarm algorithm: the size N1 of the small fish-swarm, the size N2 of the ferocious fish-swarm, the perception range Visual1 of the small fish-swarm, the perception range Visual2 of the ferocious fish-swarm, the shift step length Step1 of the small fish-swarm, the shift step length Step2 of the ferocious fish-swarm, the crowding factor $\delta_1$ of the small fish-swarm, the crowding factor $\delta_2$ of the ferocious fish-swarm, and the maximum iteration times K>0;

step 4.3: generating a small fish-swarm and a ferocious fish-swarm in a random manner according to the upper limit value and the lower limit value of the control variables to be optimized in the power grid;

step 4.4: generating a small fish-swarm and a ferocious fish-swarm in a random manner according to the upper limit value and the lower limit value of the control variables to be optimized in the power grid;

step 4.5: initializing the current iteration times k'=0, initializing the optimal value of current food concentration, and displaying the initialized optimal value of current food concentration in a bulletin board: by using 1/F as a value FC of food concentration, calculating the value of food concentration in the current network and of small fishes and ferocious fishes under an initial data condition, taking the maximum value of food concentration as the optimal value of current food concentration, displaying the optimal value of current food concentration in the bulletin board, and saving the state and the current value FC;

step 4.6: enabling the small fish-swarm to act: enabling small fish individuals to perform a foraging clustering behavior, a rear-end behavior and a protective clustering behavior according to the distance between each of the small fish individuals and ferocious fish individuals as well as the distance between the small fish individuals in the small fish-swarm, and updating the value in the bulletin board Y1;

step 4.7: enabling the ferocious fish-swarm to act: enabling each of the ferocious fish individuals to perform a predation behavior, a tracking behavior and a clustering behavior according to the distance between each of the ferocious fishes and the small fish individuals as well as the distance between the ferocious fish individuals in the ferocious fish-swarm, and updating the value in the bulletin board Y2;

step 4.8: judging whether the current iteration times k' reach the maximum iteration times K, if yes, executing the step 4.9; or else, k'=k'+1, and returning to the step 4.6;

step 4.9: taking the greater value of food concentration displayed in the bulletin boards Y1 and Y2 as well as the state thereof as optimal values so as to obtain the optimal values of the control variables, namely the optimal values of the generator terminal voltage amplitudes, the transformer adjustable ratios, and the reactive power capacity of the reactive power compensation devices; and step 4.10: transmitting the optimal values of the control variables to the reactive power executing module.

6. The method for reactive power optimization of a power grid based on the double-fish-swarm algorithm according to claim 5, wherein the step 4.3 comprises the steps of:

step 4.3.1: initializing the number $t_1=0$ of the generated small fishes;

step 4.3.2: randomly generating the small fish individuals according to the value ranges of the control variables to be optimized in the power grid:

$$X=[U_{G11},U_{G12}, \ldots U_{G1g},K_{T11},K_{T12}, \ldots ,K_{T1t},Q_{C11}, Q_{C12}, \ldots Q_{C1c}]=[x_1,x_2, \ldots ,x_s, \ldots ,x_S];$$

wherein, X is the value sequence of the control variables of the small fish individuals, $x_s=x_{s\ min}+\text{rand}(g)\times(x_{s\ max}-x_{s\ min})$, rand(g) is a random number of an interval (0, 1), $x_{s\ min}$ and $x_{s\ max}$ are respectively the lower limit value and the upper limit value of the corresponding control variables, $U_{G1g}$, $K_{T1t}$ and $Q_{C1c}$ are respectively the generator terminal voltage amplitude, the transformer adjustable ratio, and the reactive power capacity of the reactive power compensation devices in the randomly generated small and artificial fish individuals, $x_s$ is the control variables of the randomly generated small fish individuals, $1 \leq s \leq S$, $S=N_g+N+N_c$, $N_g$ is the number of the generators in the power grid, $N_t$ is the number of the transformers in the power grid, and $N_c$ is the number of the reactive power compensation devices in the power grid;

step 4.3.3: performing power flow calculation on the control variables in the randomly generated small fish individuals in the step 4.3.2 by using a P–Q decomposition method, if the power flow value of the current small fish individual is converged, retaining the small fish individual, generating a small fish number $t_1=t_1+1$ of the current small fish individual, and executing the step 4.3.4; or else, not retaining the small fish individual, and returning to the step 4.3.2; and step 4.3.4: if $t_1 \geq N1$, obtaining a current small fish-swarm, and executing the step 4.4; or else, returning to the step 4.3.2.

7. The method for reactive power optimization of a power grid based on the double-fish-swarm algorithm according to claim 5, wherein the step 4.4 comprises the steps of:

step 4.4.1: initializing the number $t_2=0$ of the generated ferocious fishes;

step 4.4.2: randomly generating the ferocious fish individuals according to the value ranges of the control variables to be optimized in the power grid:

$$W=[U_{G21},U_{G22}, \ldots U_{G2g},K_{T21},K_{T22}, \ldots ,K_{T2t},Q_{C21}, Q_{C22}, \ldots ,Q_{C2c}]=[w_1,w_2, \ldots ,w_s, \ldots ,w_S];$$

wherein, W is the value sequence of the control variables of the ferocious fish individuals, $w_s=x_{s\ max}+\text{rand}(g)\times(x_{s\ max}-x_{s\ min})$, $U_{G2g}$, $K_{T2t}$ and $Q_{C2c}$ are respectively the generator terminal voltage amplitude, the transformer adjustable ratio, and the reactive power capacity of the reactive power compensation devices in the randomly generated ferocious fish individuals, and $w_s$ is the control variables of the randomly generated ferocious fish individuals;

step 4.4.3: performing power flow calculation on the control variables in the randomly generated ferocious fish individuals in the step 4.4.2 by using a P–Q decomposition method, if the power flow value of the current ferocious fish individual is converged, retaining the ferocious fish individual, generating a ferocious fish number $t_2=t_2+1$ of the current ferocious fish individual, and executing the step 4.4.4; or else, not retaining the ferocious fish individual, and returning to the step 4.4.2; and step 4.4.4: if $t_2 \geq N2$, obtaining a current ferocious fish-swarm, and executing the step 4.5; or else, returning to the step 4.4.2.

8. The method for reactive power optimization of a power grid based on the double-fish-swarm algorithm according to claim 5, wherein the step 4.6 comprises the steps of:

step 4.6.1: determining the distance $D=\{D_{i1}, D_{i2}, \ldots , D_{ij}, \ldots , D_{iN2}\}$ between the current i small fish individual $X_i$ and each of the ferocious fish individuals $W_j$, wherein, $D_{ij}=\|X_i-W_j\|$, $1<j<N2$, and N2 is the number of the ferocious fish individuals;

step 4.6.2: if the distance $D_{ij} \leq \text{Visual1}$ between the current i th small fish individual $X_i$ and each of the ferocious fish individuals $W_j$, executing the step 4.6.3; or else, executing the step 4.6.5;

step 4.6.3: determining the total number n of the small fish individuals within the perception range of the i th small fish individual $X_i$, to determine a protective clustering safe position $X_{safe}$, and enabling the i th small fish individual $X_i$ to perform the protective clustering behavior so as to obtain an update value $X_{inext1}$ of the i th small fish individual performing the protective clustering behavior, wherein the calculation formula for the protective clustering safe position $X_{safe}$ is as follows:

$$X_{safe}=(X_{i1}+X_{i2}+ \ldots +X_{in}) \times \lambda/n,$$

wherein, $\lambda=(n+p)/n$ is an escape factor, p is the total number of the ferocious fish individuals within the perception range Visual1 of the small fish individual $X_i$, and $X_{in}$ is the small fish individuals within the perception range of the small fish individual $X_i$;

the calculation formula for the update value $X_{inext1}$ of the i th small fish individual performing the protective clustering behavior is as follows:

$$X_{inext1}=X_i+\text{rand}(g) \times \text{Step1} \times \delta_1 \times (X_{safe}-X_i)/\|X_{safe}-X_i\|;$$

step 4.6.4: judging whether the update value $X_{inext1}$ of the current small fish individual performing the protective clustering behavior meets a constraint condition and the power flow is converged; if yes, recording the state of the update value $X_{inext1}$, calculating the value of food concentration, updating the value in the bulletin board Y1, and executing the step 4.7; or else, returning to the step 4.6.3;

step 4.6.5: determining the small fish individual $X_{j'}$ with the maximum value $FC_{j'}$ of food concentration in the small fish-swarm within the perception range of the i th small fish individual $X_i$, and enabling the i th small fish individual $X_i$ to perform the rear-end behavior so as to obtain an update value $X_{inext2}$ of the i th small fish individual $X_i$ performing the rear-end behavior, wherein the calculation formula for the update value $X_{inext2}$ of the i th small fish individual $X_i$ performing the rear-end behavior is as follows:

$$X_{inext2}=X_i+\text{rand}(g)\times \text{Step1}\times \delta_1\times(X_j-X_i)/\|X_j-X_i\|;$$

step 4.6.6: determining the total number n of the small fish individuals within the perception range of the i th small fish individual $X_i$ to determine the central position $X_{c1}$ of the small fish individuals performing foraging clustering behavior, and enabling the i th small fish individual $X_i$ to perform the foraging clustering behavior so as to obtain an update value $X_{inext3}$ of the i th small fish individual performing the foraging clustering behavior, wherein the calculation formula for the central position $X_{c1}$ of the small fish individuals performing foraging clustering behavior is as follows:

$$X_{c1}=(X_{i1}+X_{i2}+\ldots+X_{in})/n;$$

the calculation formula for the update value $X_{inext3}$ of the i th small fish individual performing the foraging clustering behavior is as follows:

$$X_{inext3}=X_i+\text{rand}(g)\times \text{Step1}\times \delta_1\times(X_{c1}-X_i)/\|X_{c1}-X_i\|; \text{ and}$$

step 4.6.7: judging whether the update value $X_{inext2}$ of the current small fish individual performing the rear-end behavior and the update value $X_{inext3}$ of the current small fish individual performing foraging clustering behavior meet constraint conditions and the power flow is converged; if yes, recording the state of the update value $X_{inext2}$ and the state of the update value $X_{inext3}$, calculating the value of food concentration, updating the value in the bulletin board Y1, and executing the step 4.7; or else, returning to the step 4.6.5.

9. The method for reactive power optimization of a power grid based on the double-fish-swarm algorithm according to claim 5, wherein the step 4.7 comprises the steps of:

step 4.7.1: determining the distance $L=\{L_{i'1}, L_{i'2}, \ldots, L_{i'j''}, \ldots, L_{i'N1}\}$ between the current i'th ferocious fish individual $W_{i'}$ and each of the small fish individuals $X_{j''}$, wherein $L_{i'j''}=\|W_{i'}-X_j\|$, $1<j''<N1$, and N1 is the number of the small fish individuals;

step 4.7.2: if the distance $L_{i'j''}\leq \text{Visual2}$ between the current i'th ferocious and artificial fish individual $W_{i'}$ and each of the small and artificial fish individuals $X_{j''}$, executing the step 4.7.3; or else, executing the step 4.7.6;

step 4.7.3: determining the total number m of the small fish individuals within the perception range of the current i'th ferocious fish individual $W_{i'}$, enabling the i'th ferocious fish individual $W_{i'}$ to perform the predation behavior with a central position $X_{c2}$ of small fish-swarm within the perception range of the i'th ferocious fish individual $W_{i'}$ as the maximum value of current food concentration, and updating the i'th ferocious fish individual $W_{i'}$ as the central position $X_{c2}$ of the small fish-swarm so as to obtain an update value $X_{1'next1}=X_{c2}$ of the i'th ferocious fish individual $W_{i'}$ performing the predation behavior;

the calculation formula for the central position $X_{c2}$ of small fish-swarms within the perception range of the i'th ferocious fish individual $W_{i'}$ is as follows:

$$X_{c2}=(X_{i'1}+X_{i'2}+\ldots+X_{i'm})/m;$$

wherein $X_{i'm}$ is the small fishes within the perception range of the ferocious fish individual $W_{i'}$;

step 4.7.4: enabling the i'th ferocious fish individual $W_{i'}$ to perform the tracking behavior with the central position $X_{c2}$ of small fish-swarms within the perception range of the current i'th ferocious fish individual $W_{i'}$ as the maximum value of current food concentration so as to obtain an update value $W_{i'next2}$ of the i'th ferocious fish individual $W_{i'}$ performing the tracking behavior;

the calculation formula for the update value $W_{i'next2}$ of the i'th ferocious fish individual $W_{i'}$ performing the tracking behavior is as follows:

$$W_{i'next2}=W_{i'}+\text{rand}(g)\times \text{Step2}\times \delta_2\times(X_{c2}-W_{i'})/\|X_{c2}-W_{i'}\|;$$

step 4.7.5: judging whether the update value $W_{i'next1}$ of the current ferocious fish individual $W_{i'}$ performing the predation behavior and the update value $W_{i'next2}$ of the ferocious fish individual $W_{i'}$ preforming the tracking behavior meet the constraint conditions and the power flow is converged; if yes, updating the value in the bulletin board Y2, and executing the step 4.7.6; or else, returning to the step 4.7.3;

step 4.7.6: determining the total number r of the ferocious fish individuals within the perception range of the i'th ferocious fish individual $W_{i'}$ to determine the central position $W_c$ of the ferocious fish individuals preforming the clustering behavior, and enabling the i' ferocious fish individual $W_{i'}$ to perform the clustering behavior so as to obtain an update value $W_{i'next3}$ of the i'th ferocious fish individual $W_{i'}$ performing the clustering behavior, wherein the calculation formula for the central position $W_c$ of the fish individual performing the clustering behavior is as follows:

$$W_c=(W_{i'1}+W_{i'2}+\ldots+W_{i'r})/r;$$

wherein, $W_{i'r}$ is the ferocious fish individuals within the perception range of the i'th ferocious fish individual $W_{i'}$;

the calculation formula for the update value $W_{i'next3}$ of the i'th ferocious fish individual $W_{i'}$ performing the clustering behavior is as follows:

$$W_{i'next1}=W_{i'}+\text{rand}(g)\times \text{Step2}\times \delta_2\times(W_c-W_{i'})/\|W_c-W_{i'}\|;$$
and step 4.7.7: judging whether the update value $W_{i'next3}$ of the current ferocious fish individual $W_{i'}$ performing the clustering behavior meets the constraint condition and the power flow is converged; if yes, recording the state of the update value $W_{i'next3}$, calculating the value of the food concentration, updating the value in the bulletin board Y2, and executing the step 4.8; or else, returning to the step 4.7.6.

10. A method for reactive power optimization of a power grid by adopting the reactive power optimization system of a power grid based on the double-fish-swarm algorithm according to claim 2, comprising the steps of:
  step 1: acquiring the current network information of the power grid state data and judging whether the current network information meets the optimal state required by the power grid or not by the power grid state data acquiring processor; and if the current network information cannot meet the optimal state required by the power grid, transmitting the current network information to the relay transmitter;
  step 2: transmitting the power grid node information, the branch information, the generator information, the transformer information and the reactive power compensation device information which are acquired by the power grid state data acquiring processor and required for reactive power optimization in the network information to the control terminal, by the relay transmitter;
  step 3: acquiring the power grid node information, the branch information, the generator information, the transformer information and the reactive power compensation device information transmitted by the relay transmitter, by the control terminal as initial data to be optimized in the current network;
  step 4: establishing the mathematical model for the reactive power optimization of the power system through the control terminal, optimizing the acquired initial data to be optimized in the current network based on the double-fish-swarm algorithm so as to obtain the optimal values of the control variables in the power grid, and transmitting the optimal values of the control variables to the reactive power executing module; and
  step 5: regulating generator terminal voltages by using the generator terminal voltage regulators according to the optimal values of the generator terminal voltage amplitudes, regulating the transformer taps by using the transformer tap regulators according to optimal values of the transformer adjustable ratios, and regulating the compensation capacity of the reactive power compensators by using the reactive power compensation regulators according to the optimal values of the reactive power capacity of the reactive power compensation devices.

11. The method for reactive power optimization of a power grid based on the double-fish-swarm algorithm according to claim 10, wherein the step 4 comprises the steps of:
  step 4.1: establishing a mathematical model for the reactive power optimization of the power system by using an alpha-method, with the minimum network loss and the optimal voltage level as the optimization objectives:

$$\min F = \alpha_1 \sum_{h=1}^{nl} G_{lv}[u_l^2 + u_v^2 - 2u_l u_v \cos(\theta_v - \theta_l)] + \alpha_2 \sum_{v=1}^{N_d} \left(\frac{V_v - V_v^{sp}}{\Delta V_v^{max}}\right)^2 +$$

$$\lambda_u \sum_{v=1}^{N_d} \left|\frac{\Delta V_v}{V_{v,max} - V_{v,min}}\right|^2 + \lambda_q \sum_{k=1}^{N_g} \left|\frac{\Delta Q_k}{Q_{k,max} - Q_{k,min}}\right|^2;$$

step 4.2: setting parameters for the double-fish-swarm algorithm: the size N1 of the small fish-swarm, the size N2 of the ferocious fish-swarm, the perception range Visual1 of the small fish-swarm, the perception range Visual2 of the ferocious fish-swarm, the shift step length Step1 of the small fish-swarm, the shift step length Step2 of the ferocious fish-swarm, the crowding factor $\delta_1$ of the small fish-swarm, the crowding factor $\delta_2$ of the ferocious fish-swarm, and the maximum iteration times K>0;
  step 4.3: generating a small fish-swarm and a ferocious fish-swarm in a random manner according to the upper limit value and the lower limit value of the control variables to be optimized in the power grid;
  step 4.4: generating a small fish-swarm and a ferocious fish-swarm in a random manner according to the upper limit value and the lower limit value of the control variables to be optimized in the power grid;
  step 4.5: initializing the current iteration times k'=0, initializing the optimal value of current food concentration, and displaying the initialized optimal value of current food concentration in a bulletin board: by using 1/F as a value FC of food concentration, calculating the value of food concentration in the current network and of small fishes and ferocious fishes under an initial data condition, taking the maximum value of food concentration as the optimal value of current food concentration, displaying the optimal value of current food concentration in the bulletin board, and saving the state and the current value FC;
  step 4.6: enabling the small fish-swarm to act: enabling small fish individuals to perform a foraging clustering behavior, a rear-end behavior and a protective clustering behavior according to the distance between each of the small fish individuals and ferocious fish individuals as well as the distance between the small fish individuals in the small fish-swarm, and updating the value in the bulletin board Y1;
  step 4.7: enabling the ferocious fish-swarm to act: enabling each of the ferocious fish individuals to perform a predation behavior, a tracking behavior and a clustering behavior according to the distance between each of the ferocious fishes and the small fish individuals as well as the distance between the ferocious fish individuals in the ferocious fish-swarm, and updating the value in the bulletin board Y2;
  step 4.8: judging whether the current iteration times k' reach the maximum iteration times K, if yes, executing the step 4.9; or else, k'=k'+1, and returning to the step 4.6;
  step 4.9: taking the greater value of food concentration displayed in the bulletin boards Y1 and Y2 as well as the state thereof as optimal values so as to obtain the optimal values of the control variables, namely the optimal values of the generator terminal voltage amplitudes, the transformer adjustable ratios, and the reactive power capacity of the reactive power compensation devices; and
  step 4.10: transmitting the optimal values of the control variables to the reactive power executing module.

12. The method for reactive power optimization of a power grid based on the double-fish-swarm algorithm according to claim 11, wherein the step 4.3 comprises the steps of:
  step 4.3.1: initializing the number $t_1=0$ of the generated small fishes;
  step 4.3.2: randomly generating the small fish individuals according to the value ranges of the control variables to be optimized in the power grid:

$$X=[U_{G11}, U_{G12}, \ldots U_{G1g}, K_{T11}, K_{T12}, \ldots, K_{T1t}, Q_{C11},$$
$$Q_{C12}, \ldots Q_{C1c}]=[x_1, x_2, \ldots, x_s, \ldots, x_S];$$

wherein, X is the value sequence of the control variables of the small fish individuals, $x_s = x_{s\ min} + \text{rand}(g) \times (x_{s\ max} - x_{s\ min})$, rand(g) is a random number of an interval (0, 1), $x_{s\ min}$ and $x_{s\ max}$ are respectively the lower limit value and the upper limit value of the corresponding control variables, $U_{G1g}$, $K_{T1t}$ and $Q_{C1c}$ are respectively the generator terminal voltage amplitude, the transformer adjustable ratio, and the reactive power capacity of the reactive power compensation devices in the randomly generated small and artificial fish individuals, $x_s$ is the control variables of the randomly generated small fish individuals, $1 \le s \le s$, $S = N_g + N + N_c$, $N_g$ is the number of the generators in the power grid, $N_t$ is the number of the transformers in the power grid, and $N_c$ is the number of the reactive power compensation devices in the power grid;

step 4.3.3: performing power flow calculation on the control variables in the randomly generated small fish individuals in the step 4.3.2 by using a P–Q decomposition method, if the power flow value of the current small fish individual is converged, retaining the small fish individual, generating a small fish number $t_1 = t_1 + 1$ of the current small fish individual, and executing the step 4.3.4; or else, not retaining the small fish individual, and returning to the step 4.3.2; and step 4.3.4: if $t_1 \ge N1$, obtaining a current small fish-swarm, and executing the step 4.4; or else, returning to the step 4.3.2.

13. The method for reactive power optimization of a power grid based on the double-fish-swarm algorithm according to claim 11, wherein the step 4.4 comprises the steps of:

step 4.4.1: initializing the number $t_2 = 0$ of the generated ferocious fishes;

step 4.4.2: randomly generating the ferocious fish individuals according to the value ranges of the control variables to be optimized in the power grid:

$$W = [U_{G21}, U_{G22}, \ldots U_{G2g}, K_{T21}, K_{T22}, \ldots, K_{T2t}, Q_{C21}, Q_{C22}, \ldots, Q_{C2c}] = [w_1, w_2, \ldots, w_s, \ldots, w_S];$$

wherein, W is the value sequence of the control variables of the ferocious fish individuals, $w_s = x_{s\ max} + \text{rand}(g) \times (x_{s\ max} - x_{s\ min})$, $U_{G2g}$, $K_{T2t}$ and $Q_{C2c}$ are respectively the generator terminal voltage amplitude, the transformer adjustable ratio, and the reactive power capacity of the reactive power compensation devices in the randomly generated ferocious fish individuals, and $w_s$ is the control variables of the randomly generated ferocious fish individuals;

step 4.4.3: performing power flow calculation on the control variables in the randomly generated ferocious fish individuals in the step 4.4.2 by using a P–Q decomposition method, if the power flow value of the current ferocious fish individual is converged, retaining the ferocious fish individual, generating a ferocious fish number $t_2 = t_2 + 1$ of the current ferocious fish individual, and executing the step 4.4.4; or else, not retaining the ferocious fish individual, and returning to the step 4.4.2; and step 4.4.4: if $t_2 \ge N2$, obtaining a current ferocious fish-swarm, and executing the step 4.5; or else, returning to the step 4.4.2.

14. The method for reactive power optimization of a power grid based on the double-fish-swarm algorithm according to claim 11, wherein the step 4.6 comprises the steps of:

step 4.6.1: determining the distance $D = \{D_{i1}, D_{i2}, \ldots, D_{ij}, \ldots, D_{iN2}\}$ between the current i small fish individual $X_i$ and each of the ferocious fish individuals $W_j$, wherein, $D_{ij} = \|X_i - W_j\|$, $1 < j < N2$, and N2 is the number of the ferocious fish individuals;

step 4.6.2: if the distance $D_{ij} \le \text{Visual1}$ between the current i th small fish individual $X_i$ and each of the ferocious fish individuals $W_j$, executing the step 4.6.3; or else, executing the step 4.6.5;

step 4.6.3: determining the total number n of the small fish individuals within the perception range of the i th small fish individual $X_i$, to determine a protective clustering safe position $X_{safe}$, and enabling the i th small fish individual $X_i$ to perform the protective clustering behavior so as to obtain an update value $X_{inext1}$ of the i th small fish individual performing the protective clustering behavior, wherein the calculation formula for the protective clustering safe position $X_{safe}$ is as follows:

$$X_{safe} = (X_{i1} + X_{i2} + \ldots + X_{in}) \times \lambda / n,$$

wherein, $\lambda = (n+p)/n$ is an escape factor, p is the total number of the ferocious fish individuals within the perception range Visual1 of the small fish individual $X_i$, and $X_{in}$ is the small fish individuals within the perception range of the small fish individual $X_i$;

the calculation formula for the update value $X_{inext1}$ of the i th small fish individual performing the protective clustering behavior is as follows:

$$X_{inext1} = X_i + \text{rand}(g) \times \text{Step1} \times \delta_1 \times (X_{safe} - X_i) / \|X_{safe} - X_i\|;$$

step 4.6.4: judging whether the update value $X_{inext1}$ of the current small fish individual performing the protective clustering behavior meets a constraint condition and the power flow is converged; if yes, recording the state of the update value $X_{inext1}$, calculating the value of food concentration, updating the value in the bulletin board Y1, and executing the step 4.7; or else, returning to the step 4.6.3;

step 4.6.5: determining the small fish individual $X_{j'}$ with the maximum value $FC_{j'}$ of food concentration in the small fish-swarm within the perception range of the i th small fish individual $X_i$, and enabling the i th small fish individual $X_i$ to perform the rear-end behavior so as to obtain an update value $X_{inext2}$ of the i th small fish individual $X_i$ performing the rear-end behavior, wherein the calculation formula for the update value $X_{inext2}$ of the i th small fish individual $X_i$ performing the rear-end behavior is as follows:

$$X_{inext2} = X_i + \text{rand}(g) \times \text{Step1} \times \delta_1 \times (X_{j'} - X_i) / \|X_{j'} - X_i\|;$$

step 4.6.6: determining the total number n of the small fish individuals within the perception range of the i th small fish individual $X_i$ to determine the central position $X_{c1}$ of the small fish individuals performing foraging clustering behavior, and enabling the i th small fish individual $X_i$ to perform the foraging clustering behavior so as to obtain an update value $X_{inext3}$ of the i th small fish individual performing the foraging clustering behavior, wherein the calculation formula for the central position $X_{c1}$ of the small fish individuals performing foraging clustering behavior is as follows:

$$X_{c1} = (X_{i1} + X_{i2} + \ldots + X_{in})/n;$$

the calculation formula for the update value $X_{i_{next3}}$ of the i th small fish individual performing the foraging clustering behavior is as follows:

$$X_{i_{next3}}=X_i+\text{rand}(g)\times \text{Step1}\times \delta_1\times (X_{c1}-X_i)/\|X_{c1}-X_i\|;\text{ and}$$

step 4.6.7: judging whether the update value $X_{i_{next2}}$ of the current small fish individual performing the rear-end behavior and the update value $X_{i_{next3}}$ of the current small fish individual performing foraging clustering behavior meet constraint conditions and the power flow is converged; if yes, recording the state of the update value $X_{i_{next2}}$ and the state of the update value $X_{i_{next3}}$, calculating the value of food concentration, updating the value in the bulletin board Y1, and executing the step 4.7; or else, returning to the step 4.6.5.

15. The method for reactive power optimization of a power grid based on the double-fish-swarm algorithm according to claim 11, wherein the step 4.7 comprises the steps of:

step 4.7.1: determining the distance $L=\{L_{i'1}, L_{i'2}, \ldots, L_{i'j''}, \ldots, L_{i'N1}\}$ between the current i'th ferocious fish individual $W_{i'}$ and each of the small fish individuals $X_{j''}$, wherein $L_{i'j''}=\|W_{i'}-X_j\|$, $1 \leq j'' \leq N1$, and N1 is the number of the small fish individuals;

step 4.7.2: if the distance $L_{i'j''}\leq \text{Visual2}$ between the current i'th ferocious and artificial fish individual $W_{i'}$ and each of the small and artificial fish individuals $X_{j''}$, executing the step 4.7.3; or else, executing the step 4.7.6;

step 4.7.3: determining the total number m of the small fish individuals within the perception range of the current i'th ferocious fish individual $W_{i'}$, enabling the i'th ferocious fish individual $W_{i'}$ to perform the predation behavior with a central position $X_{c2}$ of small fish-swarm within the perception range of the i'th ferocious fish individual $W_{i'}$ as the maximum value of current food concentration, and updating the i'th ferocious fish individual $W_{i'}$ as the central position $X_{c2}$ of the small fish-swarm so as to obtain an update value $X_{1'next1}=X_{c2}$ of the i'th ferocious fish individual $W_{i'}$ performing the predation behavior;

the calculation formula for the central position $X_{c2}$ of small fish-swarms within the perception range of the i'th ferocious fish individual $W_{i'}$ is as follows:

$$X_{c2}=(X_{i'1}+X_{i'2}+\ldots+X_{i'm})/m;$$

wherein $X_{i'm}$ is the small fishes within the perception range of the ferocious fish individual $W_{i'}$;

step 4.7.4: enabling the i'th ferocious fish individual $W_{i'}$ to perform the tracking behavior with the central position $X_{c2}$ of small fish-swarms within the perception range of the current i'th ferocious fish individual $W_{i'}$ as the maximum value of current food concentration so as to obtain an update value $W_{i'next2}$ of the i'th ferocious fish individual $W_{i'}$ performing the tracking behavior;

the calculation formula for the update value $W_{i'next2}$ of the i'th ferocious fish individual $W_{i'}$ performing the tracking behavior is as follows:

$$W_{i'next2}=W_{ij}+\text{rand}(g)\times \text{Step2}\times \delta_2\times (X_{c2}-W_{i'})/\|X_{c2}-W_{i'}\|;$$

step 4.7.5: judging whether the update value $W_{i'next1}$ of the current ferocious fish individual $W_{i'}$ performing the predation behavior and the update value $W_{i'next2}$ of the ferocious fish individual $W_{i'}$ preforming the tracking behavior meet the constraint conditions and the power flow is converged; if yes, updating the value in the bulletin board Y2, and executing the step 4.7.6; or else, returning to the step 4.7.3;

step 4.7.6: determining the total number r of the ferocious fish individuals within the perception range of the i'th ferocious fish individual $W_{i'}$ to determine the central position $W_c$ of the ferocious fish individuals preforming the clustering behavior, and enabling the i' ferocious fish individual $W_{i'}$ to perform the clustering behavior so as to obtain an update value $W_{i'next3}$ of the i'th ferocious fish individual $W_{i'}$ performing the clustering behavior, wherein the calculation formula for the central position $W_c$ of the fish individual performing the clustering behavior is as follows:

$$W_c=(W_{i'1}+W_{i'2}+\ldots+W_{i'r})/r;$$

wherein, $W_{i'r}$ is the ferocious fish individuals within the perception range of the i'th ferocious fish individual $W_{i'}$;

the calculation formula for the update value $W_{i'next3}$ of the i'th ferocious fish individual $W_{i'}$ performing the clustering behavior is as follows:

$$W_{i'next1}=W_{i'}+\text{rand}(g)\times \text{Step2}\times \delta_2\times (W_c-W_{i'})/\|W_c-W_{i'}\|;$$
and step 4.7.7: judging whether the update value $W_{i'next3}$ of the current ferocious fish individual $W_{i'}$ performing the clustering behavior meets the constraint condition and the power flow is converged; if yes, recording the state of the update value $W_{i'next3}$, calculating the value of the food concentration, updating the value in the bulletin board Y2, and executing the step 4.8; or else, returning to the step 4.7.6.

16. The reactive power optimization system of a power grid based on the double-fish-swarm algorithm according to claim 1, wherein the specific process for optimizing the acquired initial data to be optimized in the current network based on the double-fish-swarm algorithm so as to obtain the optimal values of the control variables in the power grid comprises the steps of:

generating a small fish-swarm and a ferocious fish-swarm in a random manner according to the upper limit value and the lower limit value of the control variables to be optimized in the power grid;

initializing the optimal value of current food concentration, and displaying the initialized optimal value of current food concentration in a bulletin board: by using the reciprocal 1/F of the objective function of the mathematical model for reactive power optimization of a power grid as a value FC of food concentration, calculating the value of food concentration in the current network and of small fishes and ferocious fishes under an initial data condition, taking the maximum value of food concentration as the optimal value of current food concentration, displaying the optimal value of current food concentration in the bulletin board, and saving the state and the current value FC;

enabling the small fish-swarm to act: enabling small fish individuals to perform a foraging clustering behavior, a rear-end behavior and a protective clustering behavior according to the distance between each of the small fish individuals and ferocious fish individuals as well as the distance between the small fish individuals in the small fish-swarm, and updating the value in the bulletin board Y1;

enabling the ferocious fish-swarm to act: enabling each of the ferocious fish individuals to perform a predation behavior, a tracking behavior and a clustering behavior according to the distance between each of the ferocious fishes and the small fish individuals as well as the distance between the ferocious fish individuals in the ferocious fish-swarm, and updating the value in the bulletin board Y2; and when iteration times achieve the maximum iteration times, taking the greater values of food concentration displayed in the bulletin boards Y1 and Y2 as well as the state thereof as optimal results so as to obtain the optimal values of the control variables, namely the optimal values of the generator terminal voltage amplitudes, the transformer adjustable ratios, and the reactive power capacity of the reactive power compensation devices.

* * * * *